United States Patent
Wilson

(10) Patent No.: US 12,398,006 B2
(45) Date of Patent: Aug. 26, 2025

(54) MOBILE AND TRANSFERABLE TELESCOPING CONVEYOR APPARTUS AND PROCESS

(71) Applicant: Neil Wilson, Addison, IL (US)

(72) Inventor: Neil Wilson, Addison, IL (US)

(*) Notice: Subject to any disclaimer, the term of this patent is extended or adjusted under 35 U.S.C. 154(b) by 210 days.

(21) Appl. No.: 17/803,400

(22) Filed: Jun. 23, 2022

(65) Prior Publication Data
US 2023/0416025 A1     Dec. 28, 2023

(51) Int. Cl.
*B65G 67/08*     (2006.01)
*B60P 3/00*      (2006.01)

(52) U.S. Cl.
CPC ............... *B65G 67/08* (2013.01); *B60P 3/00* (2013.01)

(58) Field of Classification Search
CPC .................................. B60P 1/36; B65G 67/08
See application file for complete search history.

(56) References Cited

U.S. PATENT DOCUMENTS

| | | | | |
|---|---|---|---|---|
| 4,624,357 A * | 11/1986 | Oury | ...... | E04G 21/04 198/313 |
| 5,203,442 A * | 4/1993 | Oury | ...... | E04G 21/0409 198/313 |
| 5,498,119 A * | 3/1996 | Faivre | ...... | B60P 1/36 198/313 |
| 6,283,269 B1 * | 9/2001 | Mayer | ...... | B65G 41/005 198/313 |
| 7,168,555 B2 * | 1/2007 | Peterson | ...... | B65G 43/00 198/588 |
| 8,241,098 B1 * | 8/2012 | Latimer | ...... | A01D 41/1217 198/313 |
| 8,506,232 B2 * | 8/2013 | Gallione | ...... | B65G 21/14 414/505 |
| 8,839,968 B2 * | 9/2014 | Seales | ...... | B60P 1/5428 212/255 |
| 9,783,093 B1 * | 10/2017 | Esch | ...... | B65G 41/008 |
| 11,993,460 B2 * | 5/2024 | Wilson | ...... | E04G 21/16 |

* cited by examiner

*Primary Examiner* — Jonathan Snelting
(74) *Attorney, Agent, or Firm* — John P. Luther

(57) ABSTRACT

Provided is a portable conveying system mounted on a class 5 operable pickup truck rolling chassis with engine and transmission components for conveying material to a desired site comprising, a hydraulically operated telescopable conveying unit of a plurality of individual sections nesting in each other or extending out from each other when telescoping and an internal extendable and retractable conveying belt situated within said telescoping conveying unit, and operated manually or remotely controlled by PTO function of the pickup truck chassis engine, and wherein said individual telescoping sections are moveable relative to each other by rolling and/or sliding on polymeric slidable surfaces.

10 Claims, 17 Drawing Sheets

WEIGHT PER SECTION:

| | |
|---|---|
| 22" SECTION= | 996 LB |
| 20" SECTION= | 657 LB |
| 18" SECTION= | 484.5 LB |
| 16" SECTION= | 343.5 LB |
| 14" SECTION= | 225 LB |

| | |
|---|---|
| 17" BELT 1' = | 0.97 LB/FT |
| 17" POLY LINER 1' = | 0.97 LB/FT |
| CABLEL: 1' = | 1/2 LB/FT |

RETRACTED TO COMPACT / TRANSIT FORM

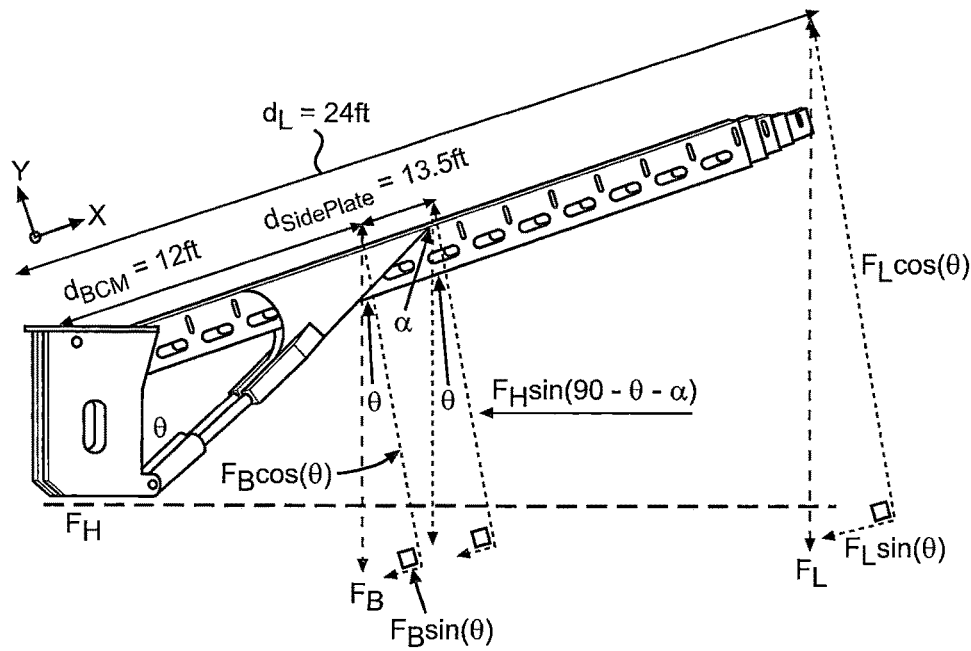

FULLY RETRACTED $$F_H = \frac{F_B\cos(\theta) \times 12 + F_L\cos(\theta) \times 24}{(13.5\sin(90 - \theta - \alpha) + \cos(90 - \theta - \alpha))}$$

ANGLE AND EXTENSION LENGTH VARIABLE $$F_H = \frac{F_B\cos(\theta) \times d_{BCM} + F_L\cos(\theta) \times d_L}{(d_{SP}\sin(90 - \theta - \alpha) + \cos(90 - \theta - \alpha))}$$

$\Sigma\tau = 8$
$\Sigma d_L = 24...85$

LEGEND AND DEFINITIONS FOR VARIABLES

| | |
|---|---|
| $\Delta =$ | CHANGE IN VALUE (INCREASING / DECREASING) |
| $DoF(\theta) =$ | DEGREES OF FREEDOM / ANGLE OF INCLINE / DECLINE WHERE 0° IS HORIZONTAL |
| $d_L$ (ft) = | DISTANCE OF LENGTH OF TRUSS BOOM (CHANGES WITH EXTENTION / RETRACTION) |
| $d_{BCM}$ (ft) = | DISTANCE OF LENGTH OF THE BOOM CENTER OF MASS (CHANGES WITH EXTENTION / RETRACTION) |
| $F_B$ (kN) = | FORCE (MASS - GRAVITY (-9.80665 m/s²) AT $d_{BCM}$ (CHANGES WITH $\Delta\theta$ / $\Delta d\tau$) |
| $F_L$ (kN) = | FORCE AT $d\tau$ (CHANGES WITH $\Delta\theta$) |
| $F_H$ (kN) = | FORCE AT HYDRAULIC CYLINDERS (CHANGES WITH $\Delta\theta$ / $\Delta d_L$ / $\Delta d_{BCM}$ / $\Delta F_B$ / $\Delta F_L$ / $\Delta F_B$) |

1kN = 224.81 lbs     Lbs TO kN CONVERSION FACTOR $F_B$(kN) = (996+657+484.5+343.5+225+($D_L$*2.5)/224.81)/2   INITIAL CONDITION = CONVEYOR UNDER ZERO
$F_L$(kN) = (996+484.5+343.5+225+($D_L$*2.5)/224.81)/2        LOAD WITH EQUAL WEIGHT DISTRIBUTION ($D_L$*2.5)   WEIGHT OF BELT, POLYMER SHEATH, AND CABLE = 2.5lbs/ft (996+657+484.5+343.5+225+($D_L$*2.5)/224.81)/2   WEIGHT OF TRUSS SECTIONS + (Dx2.5) + 2(EQUAL WEIGHT DISTRIBUTION ACROSS)

FIG. 17

MOBILE AND TRANSFERABLE TELESCOPING CONVEYOR APPARTUS AND PROCESS

FIELD OF THE INVENTION

The invention is directed to a lightweight, compact, mobile and transferrably mountable self-powered capable telescopic belt conveyor apparatus, method, system and method of manufacture and which can be mounted on any available surface, platform, sled, or rolling chassis, such as a truck which is of a size and class not requiring a commercial driver's license and/or specialized permitting or DOT requirements, or may be utilized by itself, such as on any trailerable and/or moveable platform to be brought to a worksite as contemplated, and due to its compact size is capable of accessing areas of desired use activity which conventional truck or vehicle mounted or mountable telescoping conveying apparatuses cannot access. The invention is also directed to such removable and transferable conveying apparatus which has a unique advantage of individual conveyed sections moving and delivering individual weight conveying capacities with individual extension capacities providing for extensive flexibility of use not heretofore available.

BACKGROUND OF THE INVENTION

As discussed in prior applications U.S. 20210139246 and U.S. 20200399071 large vehicle mounted conveying telescoping apparatuses have been known and in use for a number of years, as such are preferred or even necessary for use in the construction industry and many other areas.

However, as known, there does not exist desirable compact mobile mountable telescoping conveyor apparatuses, methods and systems, such that can reach relatively small spaces and areas not accessible by conventional large material conveyors, or which are capable of mounting on truck chassis of a size and class not requiring a commercial driver's license and/or specialized permitting and DOT requirements. The invention fills such a void and long desired need and capability.

SUMMARY OF THE INVENTION

The invention provides a lightweight, compact, mobile and self-powered capable telescopic belt conveyor apparatus which has comparable capabilities and capacities to much larger conventional machines, and which employs reduced conveying belt or equipment size, such as, for example, ¼ the weight of conventional machines, and for which provides for drastic size and weight reduction allowing for a comparatively small size of apparatus, but with conventional capacity for materials placement. The inventive apparatus is self-powered by any of a number of conventional power sources which can be mounted on any available surface, platform, sled or rolling chassis, such as a truck or work vehicle.

The invention is more fully described and understood with reference to the following Detailed Description of Preferred Embodiments and FIGs.

BRIEF DESCRIPTION OF THE DRAWINGS

FIG. 17 illustrates a preferred embodiment of design calculation of FIG. 15.

DETAILED DESCRIPTION OF THE PREFERRED EMBODIMENTS

Figure 1:
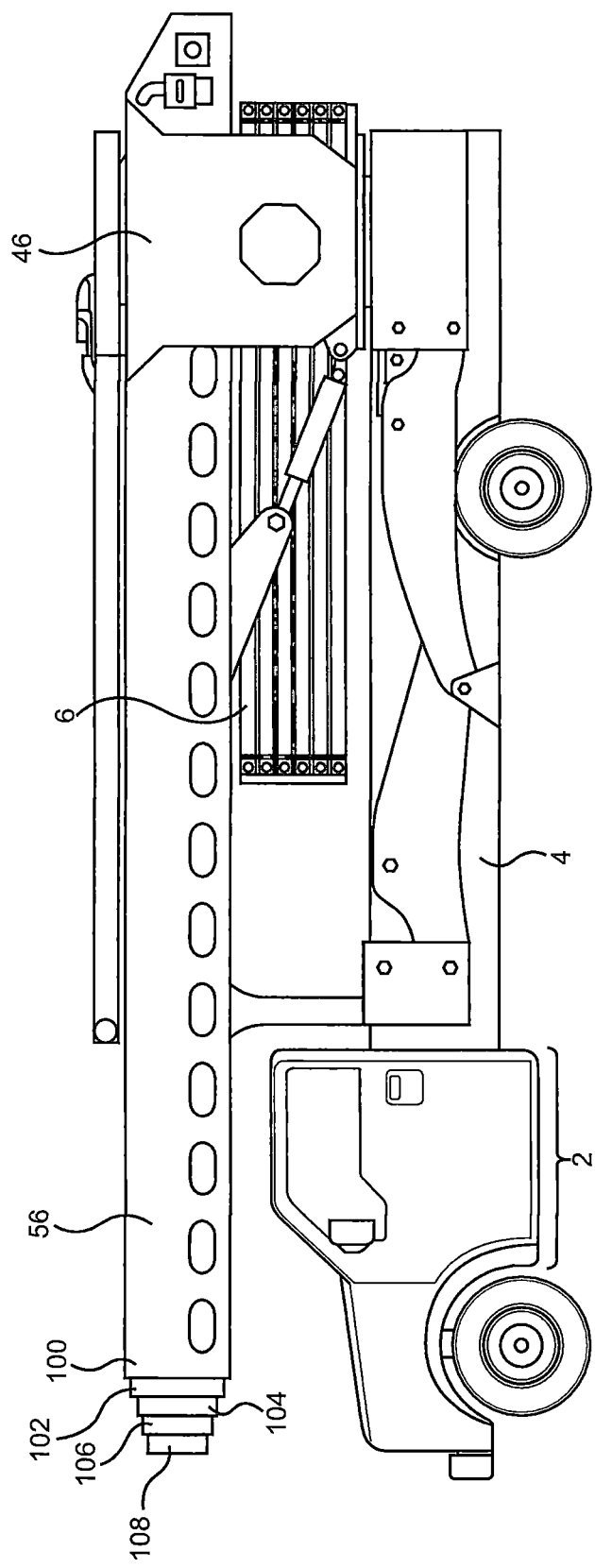
FIG. 1 illustrates a perspective view of preferred embodiment of the invention.

The invention provides a self-operating capable material conveyor apparatus that may be light and compact enough to be installed on any surface, platform, sled or transported by anything and operated from any surface, including, without limitation, any off-the-lot consumer pickup truck, small trailer, etc., to provide for maximum portability and flexibility of use, and useful with the approximate some payloads and capacity as conventional conveyors many times larger in size and weight and which are oftentimes non-desirable due to such size and weight in accessing many small areas, and in fuel consumption and man-power operation.

A preferred embodiment of the inventive lightweight, compact mobile mountable and self-powering capable telescoping belt conveyor apparatus is shown in FIGS. 1-18.

The following described preferred exemplified embodiments of equipment provide for a unique and individual standing piece of equipment heretofore not available, but yet highly desired. Exemplified is the smallest, lightest and most versatile concrete, gravel and materials placement piece of equipment yet known. By way of construction and description there is nothing of any substance on the exemplified equipment that is subject to rust, as the material placing apparatus is preferably essentially completely aluminum, including optional polymeric or other sliding surface material which may be used as a belt gliding material and with extending telescoping sections, and which when compacted together or nested within each other, also may slide on a sliding surface material.

Key materials in the designing of the inventive equipment is a combination of employing aluminum along with polymeric materials, which are enabling of very light weight equipment and also enabling for ease of movement. The use of these two materials working along with each other allows for a very tight tolerance of dimensions in the telescoping design of a conveying belt, or otherwise referred to herein as a "Tellybelt". Without such combination, tolerances would have to be undesirably much greater. Such unique inventive design allows for the enabling of a piece of equipment that may be as small as a quarter of the size of what is conventional therein providing for many unique advantages. For example, conventional units may weigh 80,000 pounds compared to the inventive apparatus which may be approximately 19,500 pounds when mounted on a light pickup truck or much less when used in a self-powered mode and mounted on a platform and the like. Further, conventional truck mounted mobile conveyors are typically around 14'-16' in height, and 65' in length and have twice as many tires, with an example inventive truck design in comparison around only 26 feet long by 9' to 10' in height. As yet a further advantage is that the inventive conveyer belt may weigh as little as 190 lbs. and be slackened, or detentioned, compacted and stored for use as a foldable serpentine design when not fully extended and then tensioned as desired for use as compared to non-foldable, non-serpentine endless conveyor belts which typically weigh approximately 4000 lbs., and which cannot be slackened, must always be under tension and cannot be compacted and stored as a serpentine belt system thus being of a very heavy weight design.

This size reduction without any lost capacity provides many advantages in fuel saving, in maintenance costs, environmental impact, etc., as explained more fully below. The conveyor belt which may slide on polymeric material facing, may be composed of, for example, a rubber/nylon material, which allowed for considerable weight reduction, such as, for example about $1/20$ of that of conventional apparatus (approximately 190 lbs. v. approximately 3,800 to 4,000 lbs.) All components are designed to be as light weight and durable as possible. Efficiency is important, along with durability for longevity of use of this equipment. The design as maintenance in consideration with all aspects of design and functionality. Safety to operators, balancing and center of gravity are built into design considerations with friendliness to use for longevity of employment of the operator.

The inventive equipment is also designed to be easily detached by unbolting in one preferred example several bolts that fasten such equipment to a chassis cab of the purchaser's choice. This may be a pickup truck chassis, or cab over, such as described, for example, in U.S. 20210139246 and U.S. 20200399071 the entirety of which is incorporated herein by reference. A main purpose for the construction of the inventive equipment is to bring to the construction placement industry a smaller, lighter, more affordable and more efficient method to move a piece of placement equipment around sites in a much more compact efficient way, and to access places where conventional designs simply cannot go. For example, in one inventive design aspect, as mentioned above, a conveyor belt may be employed, as made possible by the inventive design, that weighs a mere approximately 190 lbs., compared to conventional belts that weighs somewhere around 4,000 lbs., or approximately a $1/20$ weight difference. In short, the inventive equipment provides for major advantages in the placement industry.

For background discussion, construction of one preferred embodiment of the conveyor truck is described with reference to U.S. 20210139246 and U.S. 2020039907 using off-the-lot consumer pickup trucks to provide a powered rolling chassis with which to construct the inventive conveyor apparatus. A cab over may also be used very easily. Preferred for advantages are 1) weight of system construction material along with the strength of the material; 2) the extension and retraction of a conveying belt system for example, a 100 foot length sliding into itself to approximately a 24 foot length or less; and 3) a unique serpentine belt design that allows, for example, a telescoping design to continuously stay moving while being held in a sliding roller serpentine design track system, preferably a 6-7 roller design, beneath the main conveyor belt section. There may also be a pulley arm help support pole system that is optionally desired to be used and designed to help take desired load off of the end sections for deflection control using hydro winches, such as 2000 lbs., capacity.

With reference to a preferred embodiment of a construction process, a starting point of the construction of a truck mounted embodiment is construction of a back pedestal mount plate, where the pedestal attaches to the truck main frame of the selected rolling chassis. In this preferred example, this truck design has plurality of sections, such as five triangular sections, that slide into one another, optionally via a polymer dry glide material, and comprise the telescoping apparatus component of the invention. This telescoping component pivots from a main fixed section, and may pivot, for example, off a 3" shaft, and preferably with brass bushing inserts for the installation of a telescoping extension system, to be attached to a main vertical turntable structure. Preferably all of the welds that are done to the vertical main support pieces are welded inside and outside to better insure structural strength and integrity. These vertical pieces are then preferably bolted with grade 8 or 9 bolts vertically and horizontally to the very bottom pedestal plate. The connection of the vertical main support side pieces is preferably bolted at the bottom connection point, as such is a high torque distortion point that is stronger and more sustainable with a bolt design system. These are through bolted through the mounting plate. All bolts are of a suitable grade and of steel, preferably coated with anti-corrosion paste to stop undesirable electrolysis from occurring between different materials used.

Next, a base is manufactured and situated for the above-mentioned apparatus to sit on a turntable slewing bearing assembly which is bolted between the pedestal and the plate for the vertical structure. These parts of the apparatus are all preferably fabricated by water-jet cutting or laser cutting from a piece of aluminum material. Thickness of this piece understandably may vary depending upon such factors as contemplated use and applications. Such parts are preferably fabricated by water-jet cutting or laser cutting, so not to affect the integrity of the material by the heat that would be generated by torch cutting. This method of fabrication also ensures that all pieces are cut in uniform fashion, as attained by AutoCAD or DXF file program.

A base for the slewing bearing assembly is bolted to a turntable section as described above. The slewing bearing is preferably designed with the load capacity of approximately 250,000 foot pounds which can vary as desired. Inside of this base component may be situated structural cross members that ensure no distortion of deflection, or at least a minimum of distortion or deflection, when the upper rotatable base plate is rotating. All welds are preferably both external and internal for integrity and strength. Access to the inside of this base component may be made possible via hatch openings. The shape of this base is preferably chosen in the configuration or a radius wave shape for increased strength. The main rear outrigger arms may be connected to the bushings at the ends of each corner of this base.

The outrigger arms preferably have 5"×24" hydraulic cylinders to raise and lower the arms to the ground. Also on the rear outrigger sections may be installed extension sections that slide from internal portions of the arms preferably out approximately 30" or so to provide a more stable footprint for the truck. On the end of the extensions may be provided swivel foot pads that are in contact with the ground or other work or activity surface.

Next is described a preferred embodiment for the construction of the actual lineal section connecting the rear base section to front outrigger section. This middle section is preferably 20" high by 8'6" long by 34" wide. The width of this structure is a universal track rail width, and which allows for installation on the desired chassis cab as contemplated. A hydraulic fluid tank is preferably situated in this section which may be, for example, approximately 50 gallons capacity. A water tank may also be placed in this section, such as a hundred gallons capacity. Also, in this section is preferably situated the connection of a back pedestal section and a front outrigger section, which is designed to prevent or at least substantially reduce any defection and/or twisting of the truck frame. This section is also preferably welded internally and externally for strength and integrity and its internal cross members.

The final preferred embodiment component to the main conveyor mounting platform is the front outrigger section component. There are bottom and top plates in this section which are also preferably 1" thick, and fabricated by water-jet cutting or laser cutting to avoid problems associated with heat distortion, such as described as above. The outriggers are connected to a pedestal situated in between the top and bottom plates preferably with split brass bushing to allow for smooth and longevity of wear in its pivoting process. Once these three individual pieces are constructed, they may now be connected to one another by also once again welding top face and bottom face together. These welds are preferably done with a V groove or beveled edge to allow for deep weld penetration into one another. Preferably, all welds that are done on any part of the truck component should be of deep weld penetration to reduce any chance of weld failures. Robotic welding is also contemplated for commercial manufacture. After the three parts are connected to make a main base platform, the assembly may be bolted to the rolling truck chassis. This is done preferably by several Grade 8 bolts, approximately 26" long, that bolt through the front outrigger pedestal and the rear turn table pedestal from the top plate through the bottom plate to a three-quarter inch mounting plate that is bolted to the main frame. Anti-electrolysis paste should be used because of the different metals employed. There may be also provided a midpoint bracket that attaches on both sides of the truck frame. This completes the main deck platform fabrication and installation on the desired truck chassis. The sequential fabrication of the various assemblies and joining together as discussed is the preferred fabrication process and method although other embodiments and equivalents are contemplated.

The next part of the process is fabrication of the outrigger front and rear sections. With these sections there is a fixed swivel straight section with split bushing at each pivot point. The front outrigger section is preferably approximately 16" in length with a common pivot arm that is used for all outrigger pieces. That arm may have, for example, a 5"×24" hydraulic cylinder that pivots off the straight main section to the ground. Rear outrigger sections are the same with respect to function with the change of the straight section of approximately 42" long. A pivot arm that extends to the ground or work surface is common to the rest of the truck. This arm may have a slide out extension arm of approximately 30" with a footpad attachment on its end. This allows for an extra-large footprint for the conveyor truck installed system.

Next is described the fabrication of the telescoping triangular sections responsible for conveying action, which are described as five sections in this preferred embodiment. These may vary from, for example, 22" to 14" for the width of each triangle section such as a polymeric coating for sliding. This allows for a ⅜" spacing between each sliding section to allow for the embodiment of a coated sliding system. Preferably, the polymer employed is a dry glide material, which may employ a dry lubricant added to the polymer. This makes for a very hard slippery gliding material. The polymeric material is desirable in some embodiments for increase sliding efficiency, but is not critical to the intervention. Inside the sections is also provided a pulley cable system that is connected to a hydraulic extension and traction motor installation, which allows for movement of the triangular sections telescoping system. The pulley cable system comprises what is referred to as the "serpentine belt" system of the invention on which materials to be placed are conveyed. There are also preferably installed stops to prevent over extension of sections. In each of these sections is preferably placed polymer material, which can be used as desired (but not necessary) on all corners internal and external for desired efficiency. All polymer or otherwise slidable material may be attached by stainless steel screws that are taped in a set pattern, so each of these pieces may be replaced in maintenance individually, for the ease of maintenance. Another method would be to attach with adhesive backing but any attachment method is contemplated. Concrete or other material placement belts also slide on this polymer. There also may be a polymer track that the main belt slides on that is one of the continuous 16" approximate lengths that slide into themselves. This allows for a continuous collapsible triangular sections that can be 25' or 100' long seamlessly. Precision in the welding together of each side piece to fabricate the triangular shape of each extendable section is important. Precision should be exact as possible with essentially no differences in dimensions. This allows for efficiency in the slide and glide effect.

A key component of the inventive conveyor truck design is the serpentine retracting sliding roller system. This roller system is in a track framework which is mounted to the bottom outer edge of a first main telly belt section. This track system is mounted or fastened only to the first main section which allows for this tract to float forward and rearward, or back and forth, in between the rear pedestal framework. In a preferred example, this framework system is approximately 13'6" feet long and 20" wide by 25" in height. There are usually 6 or 7 rollers on either end of this track, which roll on double rollers top and bottom of the 7 roller bracket. The rollers may preferably be of a polymetric composition for durability and weight reduction advantage. These rollers are attached in series approximately 4 inches on center, and glide along this track in a manner that allows the belt to extend and retract with the telescoping triangular sections as desired. When the rollers extend down their roller track towards the front of the cab from the rear of the pedestal, the telescoping belt sections are untensioned for wrapping around or folding on the rollers and retreating back in retraction to the rear of the truck or platform the conveyor is mounted on. The opposite occurs when conveyor belt sections are extending out to the approximate hundred foot lengths, in which the rollers in series are retracting to the rear pedestal bracket system. This serpentine belt design system will allow for continuous belt movement and placement of concrete, gravel or any material to any length that is desired. This unique design provides for unparalleled advantages, in allowing for the belt system to be tensioned and untensioned where installed as desired and be contained when not in use in a very small, compact portion of the truck (or other platform as further described herein) and for making possible a very compact unit which may be used on relatively small truck chassis of the invention or other small platforms not heretofore possible with conventional designs. Conventional designs employ an endless roller system for extension and retraction of telescoping systems which due to extremely heavy conveying belts in use cannot be detensioned as desired and compacted in a serpentine system when not in use. In contrast, the inventive design employs a design that consists of slide and glide movement of a belt and extension system. This allows for a very efficient and easily maintained product. The tolerance of spacing is preferably a $3/16"$ to $1/4"$ for all sliding extendable/retractable sections, which has been found to reduce deflection of the extension of the system. The closer the tolerances, the less play there is between each section. Also, the material that is used as the conveyor belt itself is preferably a nylon backed material with a rubber face for better wear durability. This type of belt material reduces the belt weight by, for example, in some embodiments, by approximately $1/20$ the weight compared to conventional designs. All materials that are used on the inventive truck design are as lightweight as possible to reduce all excess weight and for ease of maintenance.

Further, with respect to the concrete conveyor belt, when coming off the main drive roller the belt is preferably shaped in a V shape to fit inside of the triangular shaped telescoping sections. This may be accomplished by an adjustable bracket such that the rollers may be configured in a way that starts to flex the belt into the shape of the inside dimension of the telescoping triangle shape of the telly belt framework. In another preferred embodiment, this bracket design also should be used at a very end section provided with a deflection guard tip section and funnel attached to allow for concrete or conveyed material to drop vertically into a flexible hose to allow for concrete or conveyed material to be placed as desired. There is also preferably provided a concrete scraper that is attached to back edge and a tip roller to scrape off excess concrete or material returning back to rear of truck.

The next area described is the optional employment of a feeder belt that brings concrete or other material from the discharge of a mixer truck on to a hopper at the end of a foldable and swiveling feeder belt system. This feeder belt is attached above and at the start of the main roller drive which is attached at the beginning point of the mounting system. There is a mounting bracket that bolts to a non-sprocketed slewing bearing, such as 28", down on to the lower main concrete or material feeder belt. With this telescopic, or otherwise retractable, feeder belt mounted to this bracket at the bearing, with a pivot point at the bracket, the belt is allowed to hinge downward with one or two actuator cylinders mounted to this bracket. These actuator cylinders are used for up and down movement for the ease of the extension and placement into position of the feeder belt. With the feeder belt extended into its position, at the very end is a hopper with legs underneath it to support weight for the discharge of concrete or conveyed material onto the hopper. With this design, the feeder belt may be folded and stored on top of the main telly section. The design of the prepared $5"\times1/8"$ aluminum 2-piece component is for ease of maintenance and reduced weight. The inventive design is much more compact in design, allowing for a lower profile for the truck mounted apparatus and less height, and thus making possible use of a small truck chassis of the invention.

There are also situated hydraulic control motors with valves and hydraulic pumps, and gearbox placement along with a water pump/pressure washer. Remote control of any element assembly is also contemplated, such as by RF or Bluetooth. As may be seen, the inventive compact unit may be employed on any "off the lot" consumer truck not requiring specialized operator's licensing and/or permitting or DOT requirements, and due to size and weight will permit access to any desired activity site where conventional products will not be able to gain access.

As discussed below in more detail, the conveyor apparatus may be provided as a separate apparatus to be configured as adapted to a platform for travel to a worksite, such as configured to placement on a rolling chassis such as a pickup truck as detailed above, and powered as a power take-off "PTO" unit by way of the truck engine and drive shaft and other drive components, or may be self-powered by way of one or more engines coupled to hydraulic pumps employed in specific duties/operations without the need for an engine powered rolling chassis, providing advantageous flexibility.

Turning now to the FIGs, there is shown several non-limiting preferred embodiments of the invention including rolling chassis powered (PTO) and self-powered example embodiments.

Rolling Chassis Powered Conveyor

Figure 2:
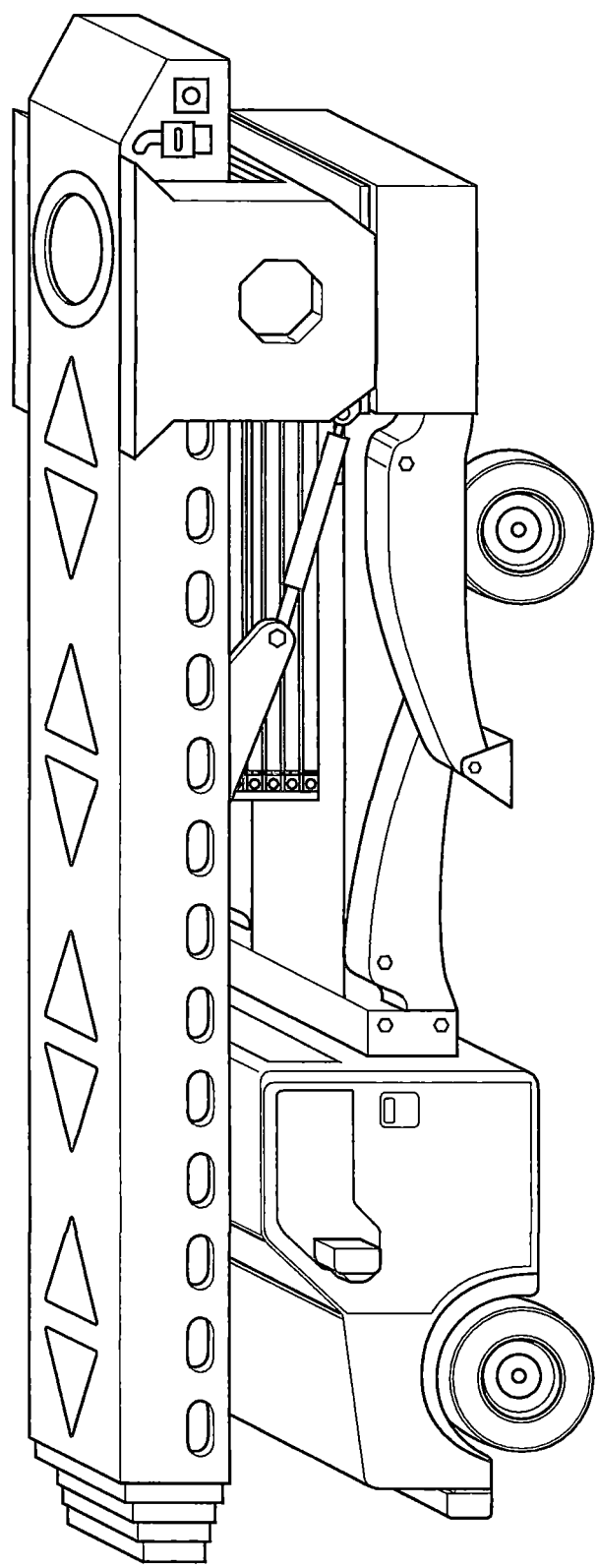
FIG. 2 illustrates an additional perspective view of a preferred embodiment of a completed conveyor truck of the invention.

FIGS. 1 and 2 illustrate a portside plan view of one preferred example of an embodiment of a pickup truck mounted telescoping conveyor system and method, and a portside perspective view, respectively. As shown in FIGS. 1 and 2, a consumer "off the lot" rolling truck chassis, shown generally as 2, is advantageously employed in the truck mounted conveyor method and system, with a structural frame and components mounted on the undercarriage and frame, or rolling chassis. As described in detail in as applications U.S. 20210139246 and U.S. 20200399671, the pickup truck chassis is of a size, including weight, length and height dimensions such that a commercial operator's license is not required to drive the truck mounted telescoping conveyor system apparatus to contemplated sites of activity, nor are any special federal, state and/or local permitting or DOT requirements in need of compliance. In other words, a consumer off-the-lot pickup truck is preferred which as shown cannot be used with extremely heavy conventional commercial conveying apparatuses.

The truck conversion unit (i.e. pickup truck) serving as the basis of the powered structural frame pickup truck chassis in accordance with the invention can easily be obtained from any conventional dealership, and where such can be easily serviced or by any other vehicle servicing entity. A preferred example of a conversion in accordance with the invention as mentioned is shown in FIG. 1, with some preferred dimensions, and preferred component set ups discussed in more detail below. As generally shown in FIG. 1 there is a plan side schematic view of the port side a typically converted diesel engine controlled split shaft power take-off ("PTO") hydraulic mobile unit which can be operated with an ordinary driver's license and needs no special permitting of any kind to travel over any type of roads to a contemplated job site, be it a multilevel building, foundation, or a backyard pool, etc. In this preferred example in FIG. 1, the truck is modified by stripping all non-essential components extending from the back of the cab compartment leaving the transmission housing, engine and components and rolling chassis with wheels and outer frame rails shown generally as 2. To the extent possible all modified components installed including mounting brackets, reservoir components, such as hydraulic fluid and water reservoir compartments, pipe and hose containment compartments and the like, except, for example, hydraulic pump cylinders and the like, are of aluminum or composite construction to reduce weight. Thus, as shown in FIG. 1, there is shown generally a mobile conveying apparatus mounted on the undercarriage bed frame of a pickup truck chassis 4, fitted with a hydraulic fluids tank (not shown in this FIG. 1), water tank 14 (not shown in FIG. 1), and conveyor apparatus components and assemblies, shown generally as 6, as discussed above, above a drive shaft apparatus (drive shafts and differentials discussed below) and real axel gear hub, with electronic control capability (all not shown in this FIG.) In this particular preferred embodiment, the truck modified to mobile conveying apparatus in accordance with the invention is approximately 27' long from front truck bumper to end. This consumer base model such as a major U.S. brand base model, typically has a wheelbase of 205" and employs dual back wheels. The suspension may employ a steel lift kit, while otherwise remaining stock. A split dual driveshaft set up with a distribution gearbox transfer case assembly operably situated therebetween is exemplified in this preferred example, preferably employing a gearbox comprising a yolk valve such as a distribution gearbox, which is installed as operably coupled to the dual drive shafts as further explained below. This preferred example mobile conveying system is unique in employing two drive shafts in operable connection with a distribution gearbox. This preferred example is of approximately 19,500 lbs. preferred, and up to 23,000 lbs., Gross Vehicle Weight Rating ("GVWR") contemplated.

Figure 3:
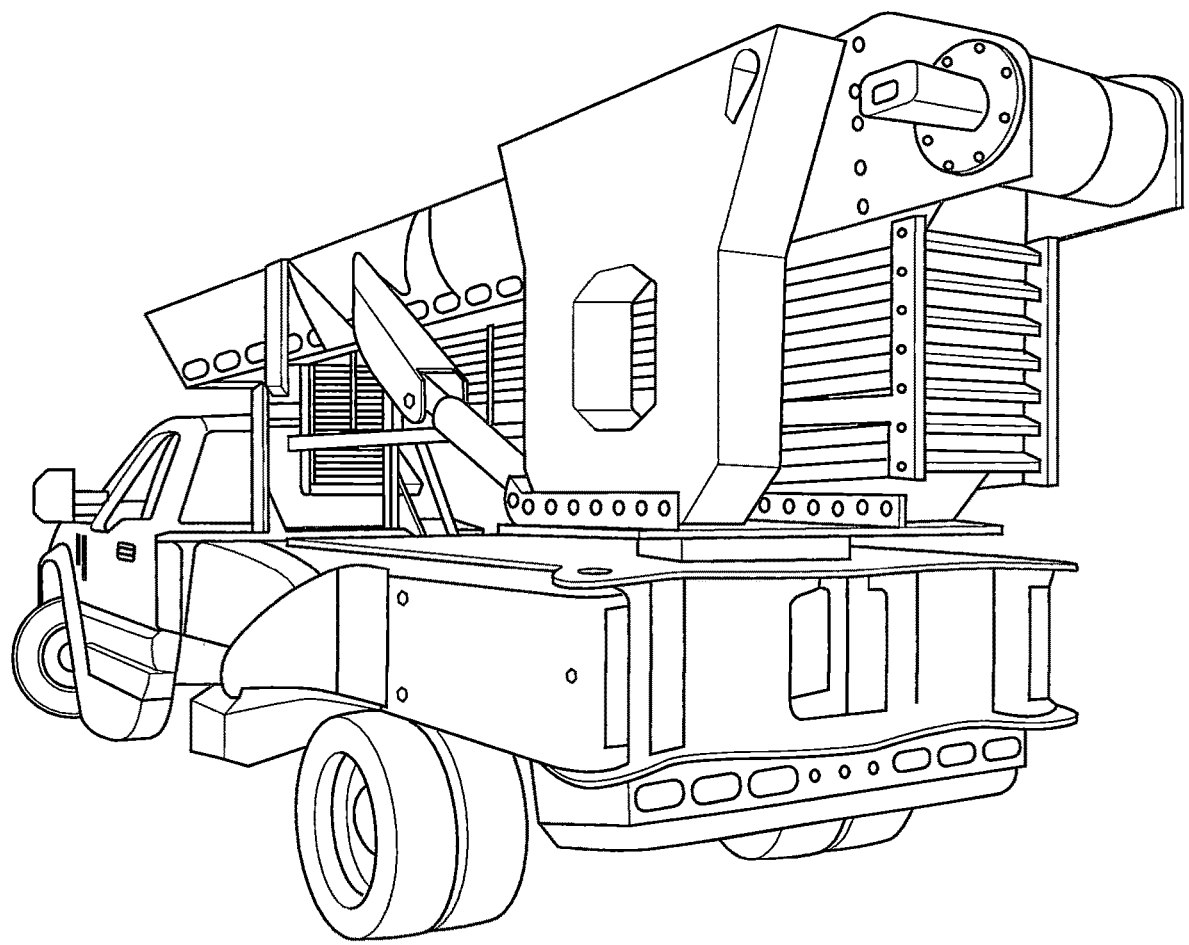
FIG. 3 illustrates yet another perspective view of a preferred embodiment of a completed conveyor truck conversion.
Figure 4:
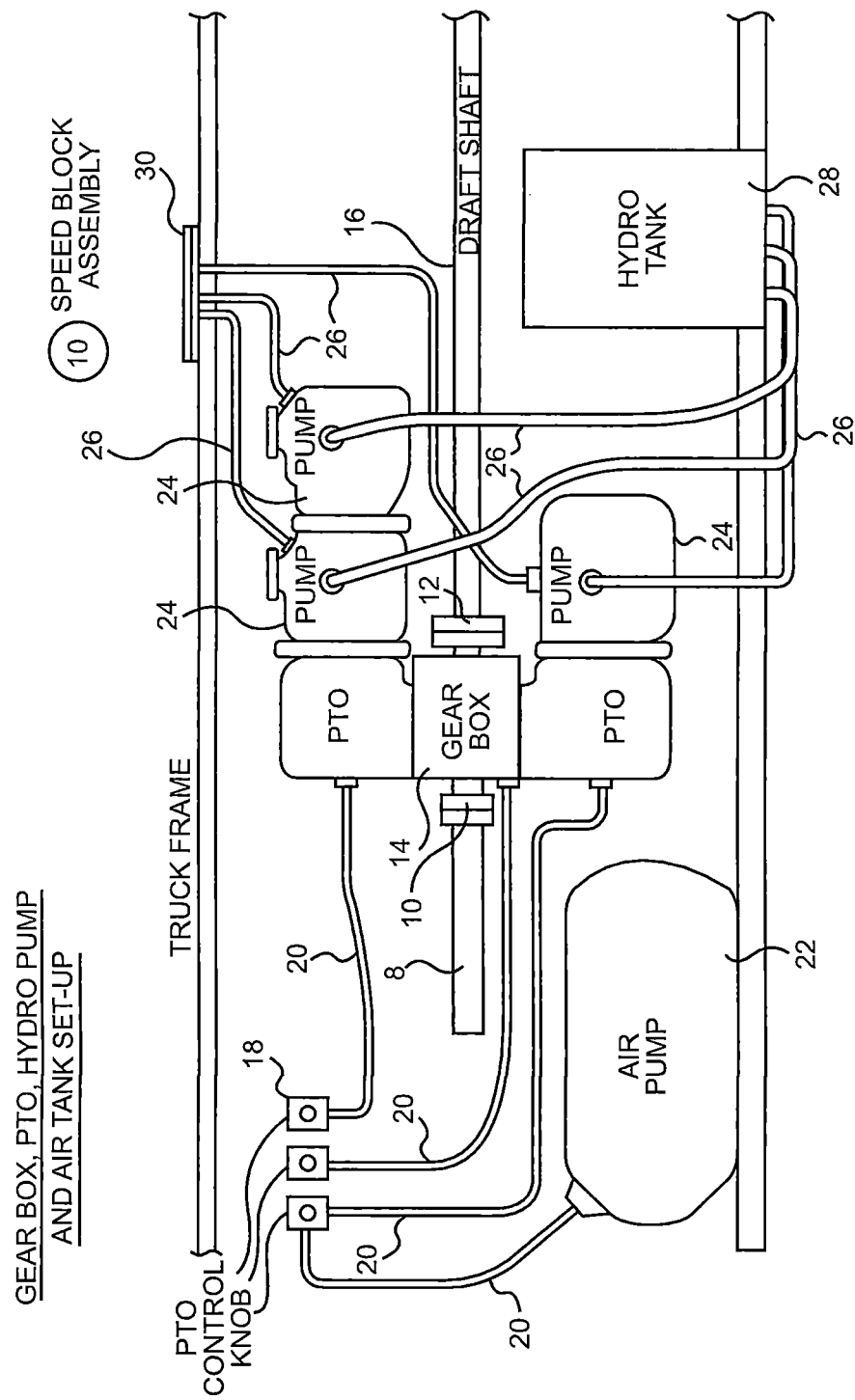
FIG. 4 illustrates a preferred embodiment of some components of the invention.

Shown in FIG. 3 is another perspective rear view of a preferred embodiment completed truck conversion. The PTO drive via first and second drive shaft apparatus is essentially the same as that described in U.S. 20210139246 and U.S. 20200399071 Referring to FIG. 4, the rolling chassis generally shown as 4 complete with dual rear wheels conversion is fitted with a first drive shaft 8 with universal joints 10 and 12 connected to distribution gearbox/transfer case, shown generally as 14, which is supplied with airlines operably connected to a compressed air unit (not shown), with air lines (not shown), preferably ¼", and operated by an air valve switch (such as situated in the vehicle cab and not shown) to control a yoke valve (not shown) which engages and disengages the gearbox 14 with first drive shaft 8 on demand, or in other words performs a PTO driven function. When not engaged (or disengaged), the gearbox 14 is coupled by way of a second universal joint 12 to a second drive shaft 16 which driveably operates the vehicle rolling chassis 2 for movement of the conveying system to a worksite. It is also contemplated that yoke valve be operable by an electronic switch. Also shown in FIG. 4 are PTO controls 18 as connected by air lines 20 and air tank 22, operating PTO functions and gearbox 14.

As further shown in FIG. 4, various pumps 24 in operable connection via hydraulic pumping lines 26 as connected to hydraulic reservoir 28 are used to operate other components of the assembled conveying apparatus, such as spool block assembly 30 which operates the serpentine assembly as more fully discussed below. All of the above mentioned components are situated at the truck frame 4 portions of the rolling chassis 2 to provide a low center of gravity, and low in height in an assembled unit for compactness and greatly reduced weight.

Figure 5:
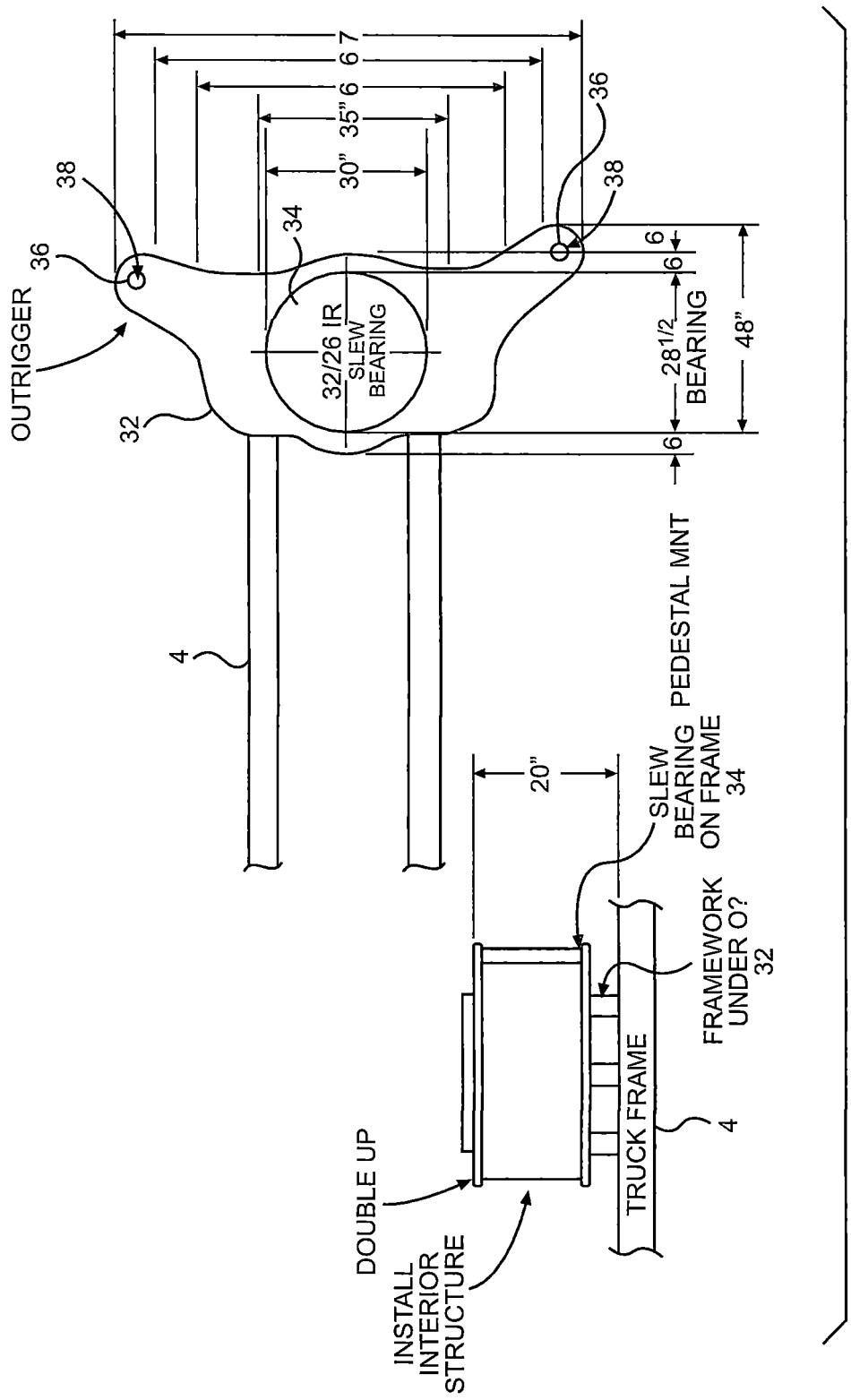
FIG. 5 illustrates a preferred embodiment of some components of the invention.

Referring to FIG. 5 is shown in detail the back pedestal mount plate 32 attached to the truck main frame 4 via turnable-slewing bearing assembly 34. Attachment and starboard outrigger arms are shown as 36.

Figure 6:
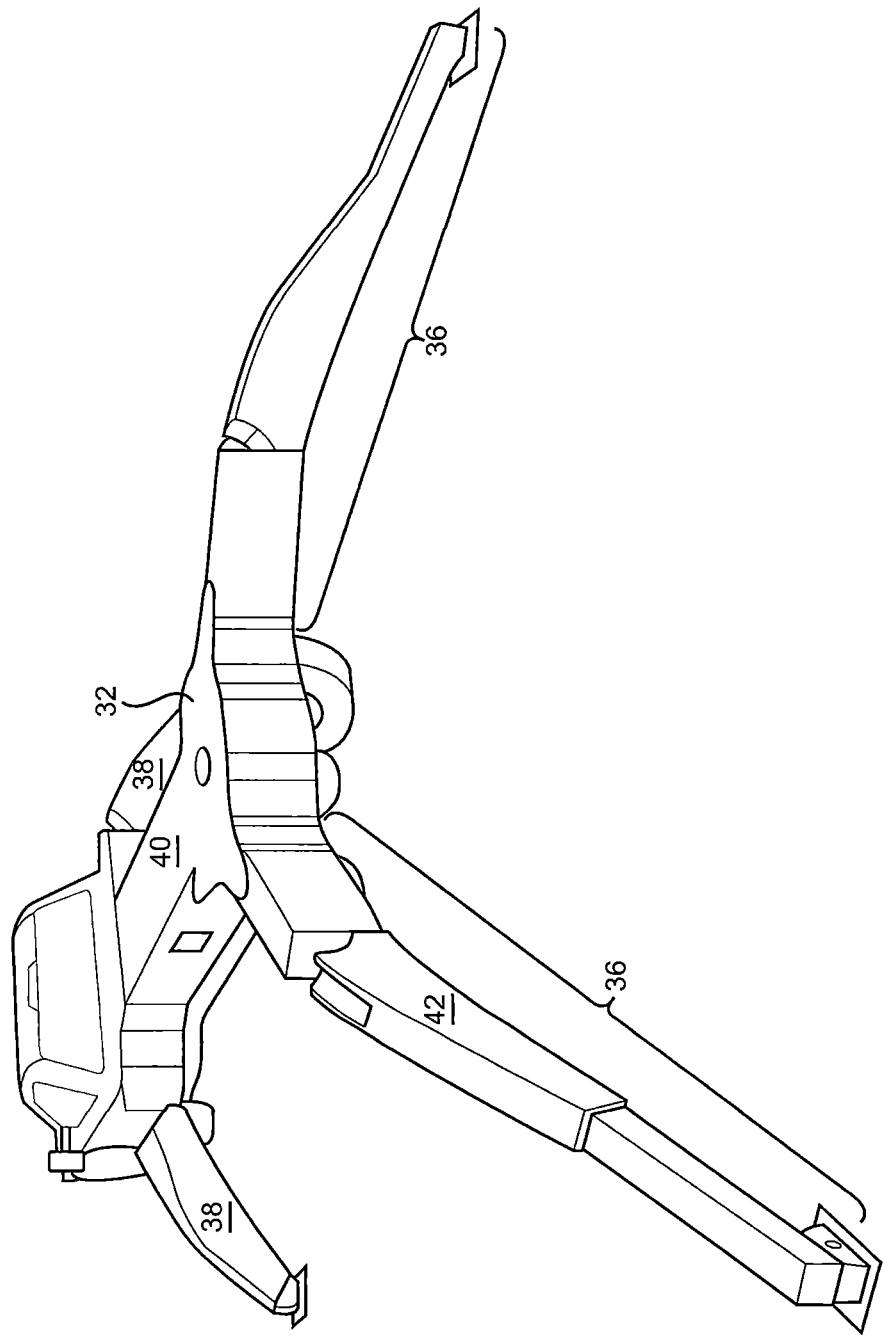
FIG. 6 illustrates a preferred embodiment of some components of the invention.

FIG. 6 illustrates truck chassis 2 with components on frame 4 inclusive of pedestal mount plate 32 with both port and starboard rear outrigger arms 35 and port and starboard front outrigger arms 38 attached to frame 4 lineal middle section 40. In this embodiment front outriggers 38 are preferably 7 feet in length and rear outriggers are 10 feet in length with 3-foot telescoping extension, both front and rear outriggers 36 and 38 being fitted with swivel pad mounts 44.

Referring to FIGS. 5 and 6, the pedestal mount 32 fitted with slewing bearing/table 34 will preferably allow for the horizontal pedestal framework to turn in a 360° radius, and which is mounted in between the main pedestal mount 32 and framework for the telescoping triangular extensions, described in more detail below.

Figure 7:
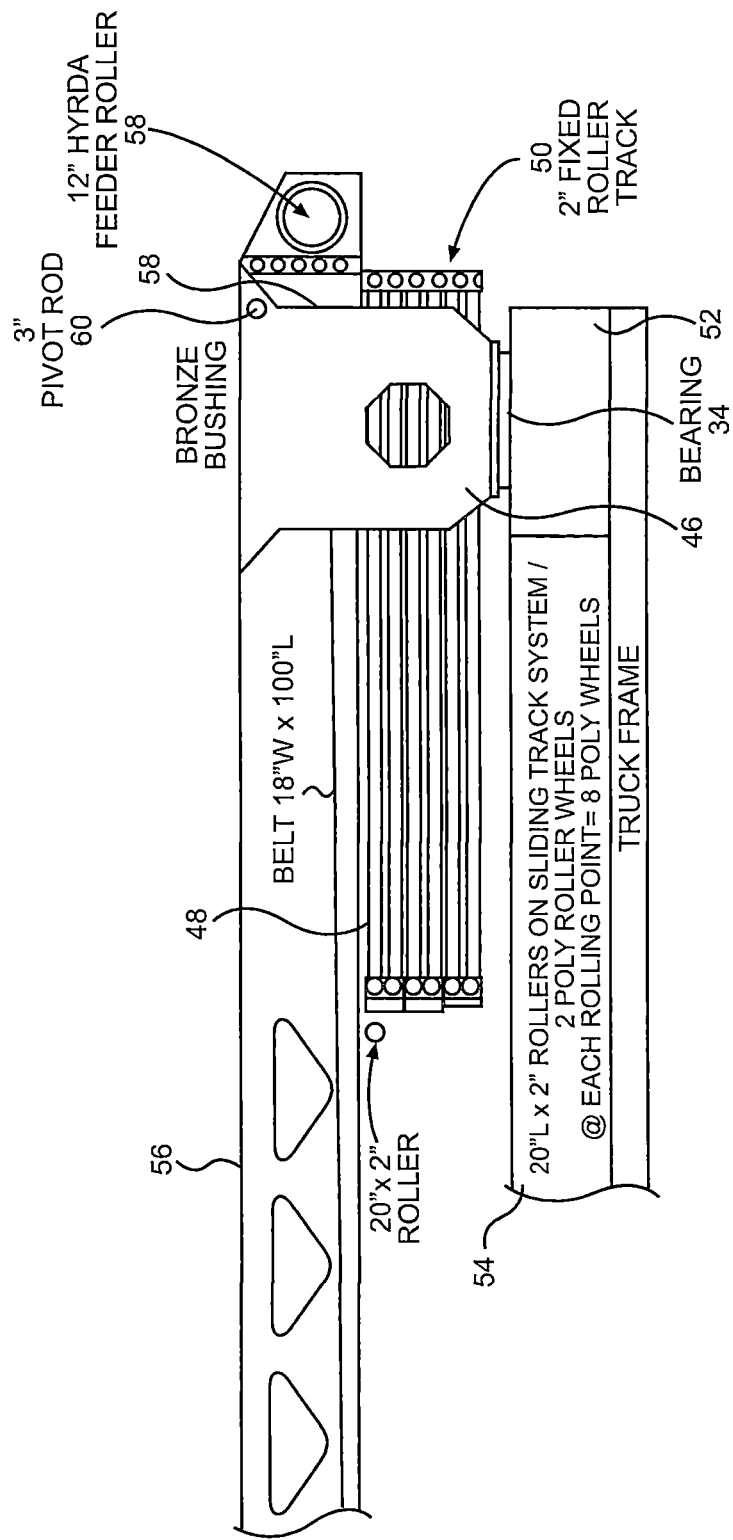
FIG. 7 illustrates a preferred embodiment of some components of the invention.

FIG. 7 shows a port side plan view of truck frame 4 fitted with pedestal mount 32 and slewing bearing table 34 to which is attached rotatable (via slewing bearing table 34) framework 46 for mounting movable serpentine belt storage, shown generally as 48. As indicated FIG. 7, serpentine belt 48, shown here as preferably 18" in width by 100' in length, is wound and stored in rollers 50, preferably 6-7 fixed rollers on a fixed 2" roller track 51 at the rear and a sliding roller track 54 at the portion of serpentine belt system 48 which also preferably comprises 6-7 fixed rollers 55. As mentioned above, rollers 55 may preferably be composed of polymeric material for durability and light weight advantages. Sliding track 54 may move back and forth horizontally by way of a wheel arrangement (not shown), preferably comprising 4 or so wheels to extend or compact the serpentine belt 48 system for storage on rollers 50 in a generally untensioned state as also discussed below. The serpentine belt 48 is attached to telescoping triangular sections 56 and stored as desired by way of a hydraulically operable feeder roller 58, which may be 12" in diameter, while telescoping triangular sections 56, may also be elevated as desired via hydraulic action via a pivot rod assembly 60. The telescoping triangular sections in a preferred embodiment slide in and out from each other preferably with the aid of polymeric dry glide facing material as described, with the facing material is shown as a colorless or white material on the facings of sections 56. Within the telescoping triangular sections is the conveyor belt of a preferable 15" or 18" width which in a preferred embodiment slides on the polymeric facing material, such as a conveyor belt of rubber/nylon material as mentioned above. The entire conveyor belt in this preferred embodiment due to the advantageous conveyor design and compactible, detensionable serpentine nature weighs approximately 190 lbs. vs approximately 4000 lbs. of conventional conveyor designs, which cannot be serpentine and detensioned to be compacted as described herein due to fabrication design, constant tensioning and bulk and weight.

The telescoping triangular sections 56, each smaller in size than the other, of which there are preferably 5 in number in this preferred embodiment, slide into each other (nest) starting with the outermost section into the next larger in diameter section and then into the next still larger section and so on, preferably via installed polymer dry glide facing material as described, or extend in like manner all by way of a cable means, such as a ⁵⁄₁₆" steel cable, operable by a hydraulic planetary motor, or otherwise to extend or retract the individual telescoping triangular sections by unwinding/winding the cable (all not shown). In other words, the telescoping triangular sections comprise a plurality of sections, nesting in each or extending out from each other when telescoping.

The telescoping sections 56, as shown in triangular configuration, are also contemplated to be in a circular cross-section configuration or oval cross section in shape, or in any geometric cross-section shape as desired, and with serpentine conveyor belt 48 situated within telescoping nesting sections 56 also contemplated to be of smaller or wider widths than 18", depending on factors such as end use contemplated.

As will be recognized and appreciated by these skilled in the art, the 360° rotatable and elevatable, telescoping triangular sections for conveying material for placement, such as concrete and gravel or any construction or non-construction material contemplated is made very compact by the operating track sliding serpentine belt arrangement. This inventive apparatus enables placement of such conveying equipment having desired capacity of 18" with convenience capacity of a relatively much smaller truck chassis than would otherwise be required and without attendant extension equipment, motors and the like, providing for materials conveyance apparatus much reduced in height and weight from conventional apparatus, and thus providing many advantages as discussed over conventional apparatus.

Figure 8:
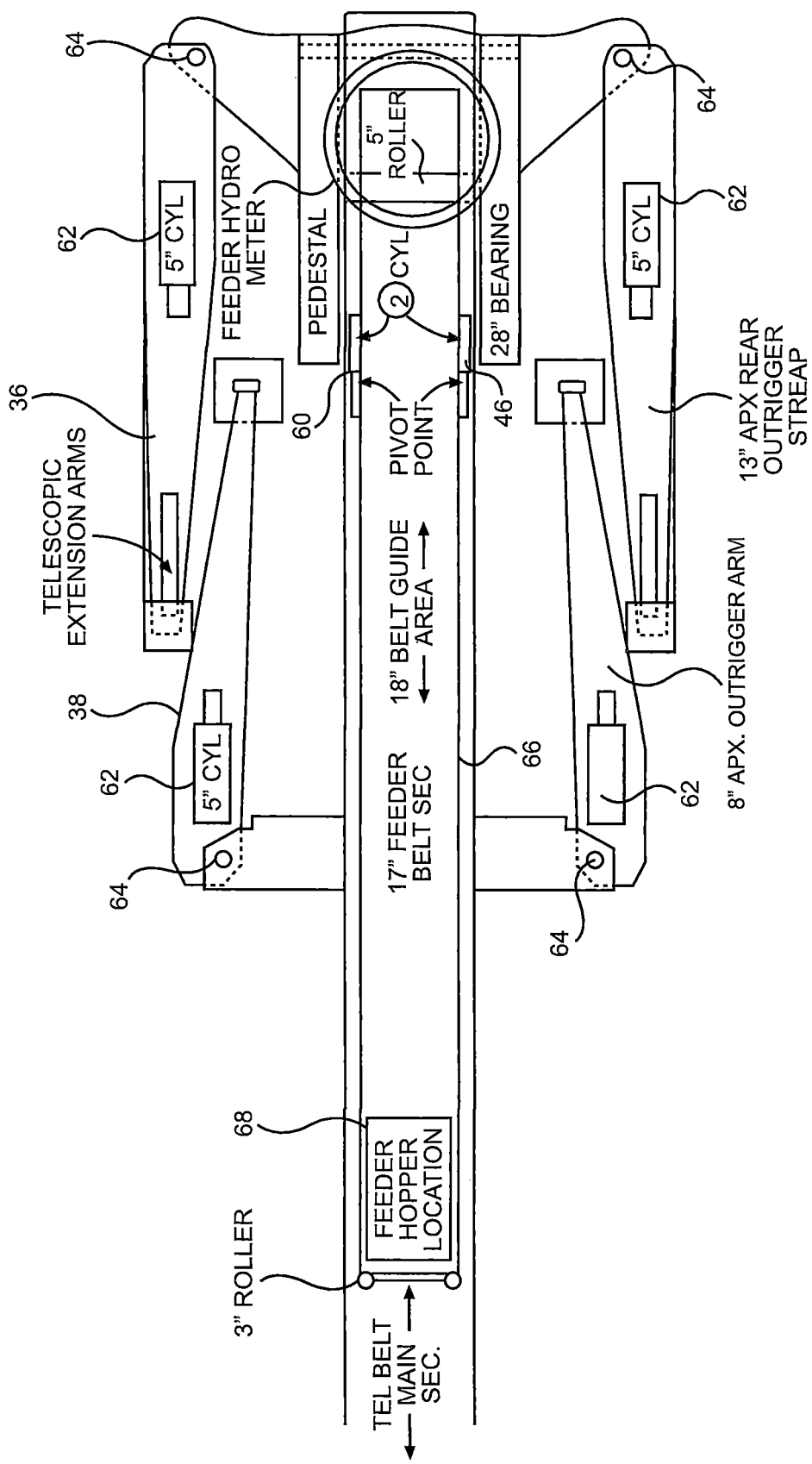
FIG. 8 illustrates a preferred embodiment of some components of the invention.

FIG. 8 shows a top plan view of the installed apparatus which operates the triangular telescoping sections system 56 for material conveyance. As shown both port and starboard, front and back outrigger, arms 38 and 36 respectively, are in a folded in position for travel of the telescoping conveying apparatus as mounted on frame 4 of rolling chassis 2. The outrigger arms 36 and 38 are foldable or otherwise operably moveably by way of hydraulic cylinder operated means 62. Outrigger arms are attached to frame 4 at pivot points 64. Also shown in this plan view is pedestal 32 with slewing bearing 34 on which is mounted rotatable (via rotatable bearing 34) telescoping triangular sections 56 by way of framework 46, on which telescoping triangular sections 56 pivot on pivot points 60. Also shown is feeder belt section 66 situated inside of sections 56 for conveying concrete slurry on other desired material to a contemplated site. As described, the belt section delivering material through telescoping triangular sections preferably glides on installed polymeric material as shown in white or colorless facing but any slick or reduced friction material may be employed or not employed at all. A feeder section 66 receives the material of choice to be conveyed.

Figure 9:
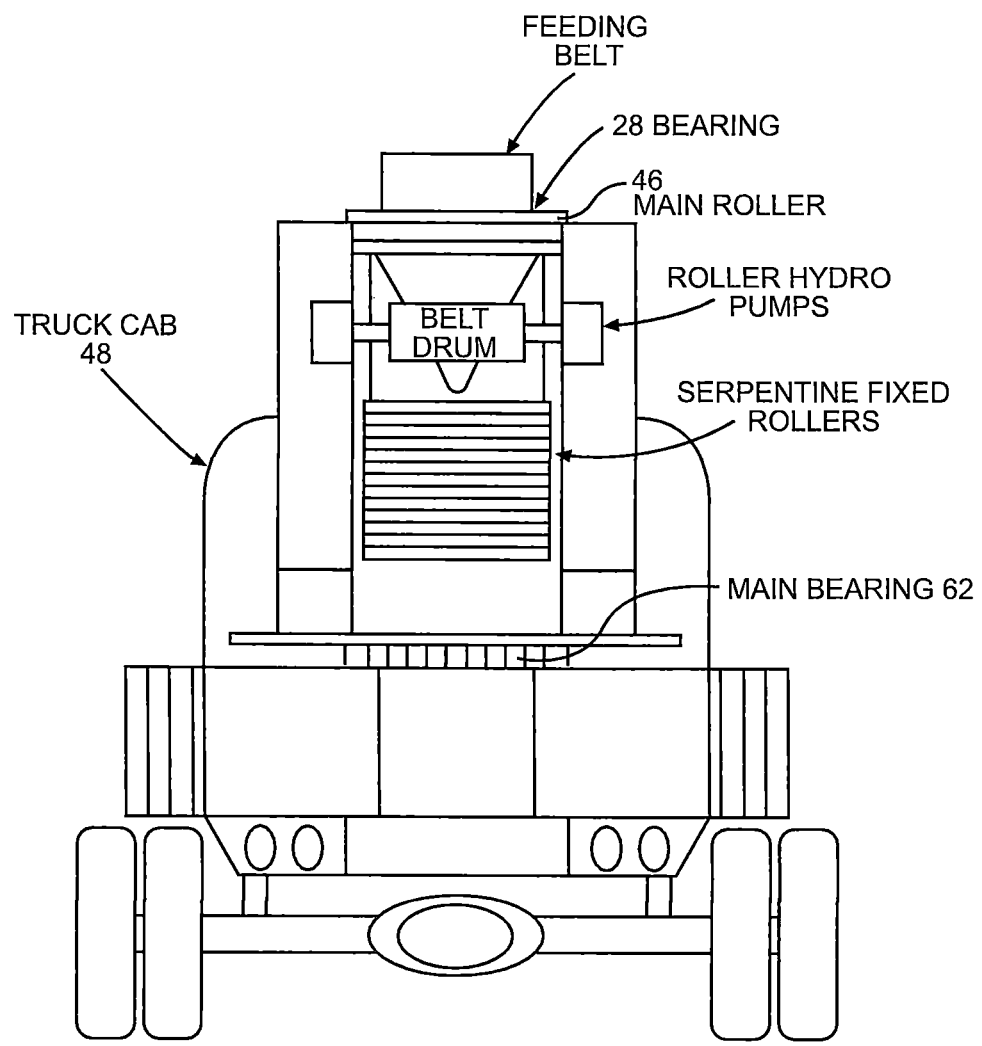
FIG. 9 illustrates a preferred embodiment of some components of the invention.

FIG. 9 shows a rear view of the serpentine belt apparatus/system 48 which winds/unwinds the serpentine belt system 48 by way of a hydraulically operable belt drum 70. The telescoping sections 56, of which there are preferably 5 in number in this preferred embodiment slide out of within each other in telescoping action as described above. The telescoping sections are attached to the rotatable framework 46, preferably, by 3" in diameter bronze bushing pivot pins (not shown here). The main bearing is shown as 62 in this view.

As also described, preferably a 17' telescopic feeder belt attached to a 28" bearing mounted to the main vertical pedestal structure is bolted to the feeder belt, which as described is rotatable 360° with one or more actuator cylinders (not shown) which allow for raising and lowering of the feeder belt to where a hopper 68 may be attached, and which hopper 68 may be removable. The feeder belt is preferably ⅛" thick aluminum in a dual-piece monolithic structure to provide strength and integrity and ease slide and glide of a rubber/nylon moving belt to receive material (concrete slurry) to be conveyed on the hopper and to the top of the main telescoping section 46 for placement of concrete, gravel or other material is contemplated.

An additionally preferred embodiment employing a rolling chassis, e.g., an off the lot major brand dual rear wheel diesel pickup truck, with preferred structural/functional features is shown in FIG. described below.

With the features of the conveyor having been detailed above and as shown in FIG. 1, essentially, the framework 46 is configured for attachment to the rolling chassis 4 and for rotation relative to the rolling chassis 4. The hydraulically operable telescoping conveying unit attached to the framework 46 and having a plurality of telescoping sections 56 nest in or extend out from each other at a nesting end of non-telescoping section 100 and each telescoping section 102-108 when telescoping. Shown here as sections 100-108, section 100 is the only non-telescoping section, but rotatable relative to rolling chassis 4 along with other nesting telescoping sections 102-108. The conveyor apparatus further preferably includes a geared driven system that is configured to cause telescoping sections 102-108 to be axially extended or retracted with each section preferably moving in unison. However, any extension or retraction apparatus or system is contemplated. In this embodiment axial movement of telescoping sections 102-108 at different rates and/or different distances relative to one another is also contemplated for maximum flexibility and adaptability to different work or job sites. A force is applied for telescopic movement of the telescoping sections 102-108 only to the telescoping base section 102. The remaining moving sections 104, 106, and 108 are pulled in or out in unison with equalizer cables 109 which can be of varying proportions as desired. Equalizer cables 109 are preferably maintained to a determined desirable tension by a tensioning system, an example of which is discussed below. Power may be provided by a dedicated motor, by a motor shared with other devices, or through other means as also shown below in a further embodiment.

Figure 10:
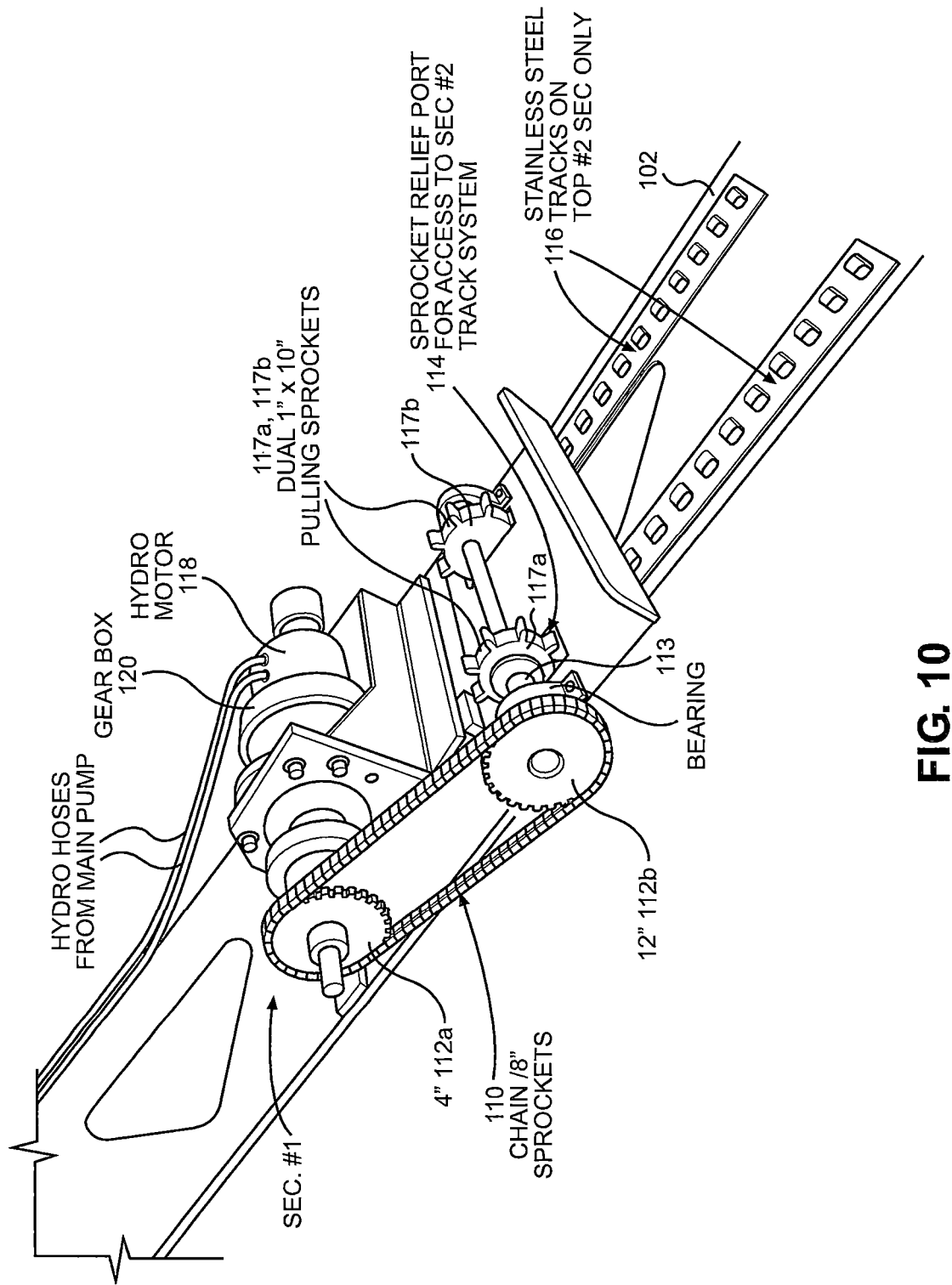
FIG. 10 illustrates a preferred embodiment of tack assembly and transmission assembly of the invention.

A motor 118, shown in the embodiment in FIG. 10 as a hydraulically operated motor, is installed at top of the non-telescoping section 100. Preferably the motor 118 is hydraulic and is positioned at tip end of the non-telescoping section 100. The motor 118 drives a track assembly via a transmission assembly for telescoping the base section 102. In this embodiment the transmission assembly of a chain-sprocket system is employed, although alternative motion transmission assembly such as gear chains, wheels-belt, friction wheels, cable and spool or otherwise is contemplated, as desired. The track assembly includes dual geared sprockets 117a, 117b with power transmitted by the motor 118 via the chain-sprocket transmission assembly. The chain-sprocket transmission consists of a sprocket driven chain 110 wrapped around a pair of sprockets 112a, 112b, preferably each sprocket being between approximately 4" to 12" in diameter as shown, depending upon placement application of the sprocket. As shown in FIG. 10, in a preferred embodiment sprocket 112a is approximately 4" in diameter, sprocket 112b is approximately 12" in diameter and sprockets 117a and 117b are approximately 10" in diameter. Sprocket 112a is engaged with shaft 111 of the motor 118 while another sprocket 112b is engaged with axle 113 of the dual geared sprockets 117a, 117b. The motor 118 outputs power to drive the sprocket 112a to rotate and thereby transmit the rotational motion to the sprocket 112b via a chain 110. The rotational motion is then transmitted from the sprocket 112b to the axle 113 and thereby drives the geared sprockets 117a, 117b. The track assembly further includes tracks 116 mounted on the base section 102. The geared sprockets 117a, 117b mounted on a suitable axle 113, such as a bar support, operate through an opening or a relief port 114 by gear teeth, or cogs, interacting with a plurality of complimentary openings on the tracks 116 to advance or retract the telescoping base section 102 as desired and in unison with other telescoping sections 104, 106 and 108. The geared sprockets 117a, 117b are operably rotated to advance or retract by way of the driven chain 110 controlled by the motor 118 with gear box 120, although any suitable motor, electric or otherwise is contemplated. Additionally, while two geared sprockets are shown in this embodiment, one geared sprocket interacting with one complimentary track may be employed as desired, to advance or retract the telescoping base section 102. In this embodiment, sprockets, gears, etc., are preferably fabricated from stainless steel for durability and longevity. Slidable polymer as described and shown herein may also be employed as desired to aid in facilitating movement of the telescoping sections 106-108 relative to one another.

Figure 12:
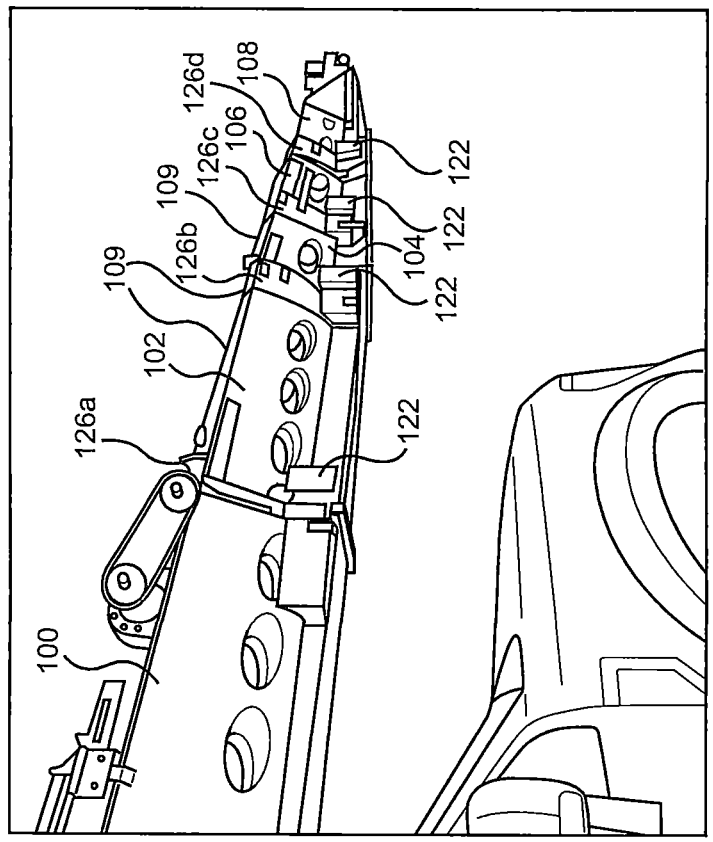
FIG. 12 illustrates a preferred embodiment of some components of roller assembly, telescoping sections and nesting ends of the invention.
Figure 11:
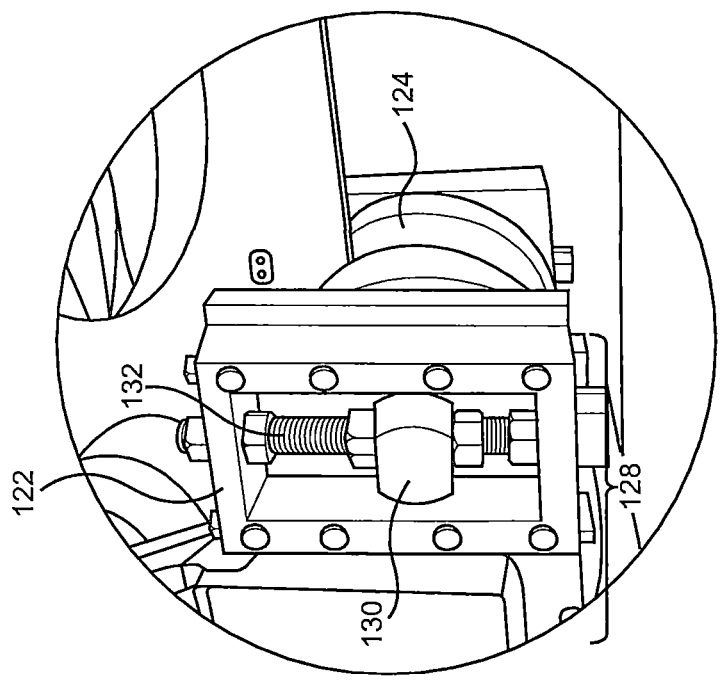
FIG. 11 illustrates an enlarged view of a preferred embodiment of roller assembly of the invention.

In another preferred design as shown in FIG. 11, a feature of an adjustable mounted roller assembly 122 is introduced to the conveyor. This roller assembly comprises one or more rolling wheels, collectively 124, enclosed by mounting frames, collectively 128, adjustably mounted to the bottom outer edge of the non-telescoping section 100 shown in FIG. 12 and the telescoping sections 102, 104, 106 and 108. Cables 109 extend or retract the respective telescoping sections 102, 104, 106, and 108 from non-telescoping section 100 by way of motor 118, or otherwise planetary motor 118, as discussed herein and as shown in the FIGSs. It is to be understood that this is only one preferred embodiment as contemplated, and that many other plausible embodiments are also contemplated for extending and retracting telescoping sections herein, such as, for example, without limitation, that employed as a telescoping boom-ladder or aerial on TeleSqurt® firetruck series. Each of the telescoping sections 102, 104, 106, and 108 is preferably mounted with at least one rolling wheel upon which each section may extend or retract by, at least in part, rolling on to facilitate axial movement of the next section, and thereby the roller assembly facilitates sliding of the sections relative to one another as they are extended or retracted. Also as illustrated in FIG. 12 each rolling wheel is mated to a respective mounting frame 128 comprising an adjusting mechanism to allow for vertical adjustment of the wheel to accommodate the movements of the respective section. Preferably, the adjusting mechanism includes a moveable shaft 130 shown in FIG. 11 engaged between threaded rod 132 and axle of the rolling wheel in a manner that by having the moveable shaft 130 moved along the threaded rod 132 thereby also moving the rolling wheel 124 to allow for vertical adjustment of the wheel 124. In another embodiment, the adjusting mechanism may be automatically operable by means of a hydraulic actuated pump, or electrically actuated by a solenoid. More than one mounted rolling wheel assembly per telescoping section is also contemplated.

Additionally, in a preferred embodiment the reach of the telescoping sections 102-108 fully extended is approximately 90 feet to approximately 100 feet, with approximately 90 feet the preferred fully extended length. Preferably, the apparatus is capable of moving approximately 150 yards of material per hour. The telescoping extensions may exceed 100 feet as desired depending on scale of construction, and is not intended to limit the invention in any way.

Also preferred in these embodiments is a fully loaded conveyor pickup truck assembly apparatus of approximately 9,000 lbs. to approximately 21,000 lbs., with approximately 21,000 lbs. preferred. Thus, a preferred embodiment encompasses an approximately 90 feet full extension of the telescoping sections 102-108 with a fully loaded conveyor truck of approximately 21,000 lbs. In some additionally preferred embodiments fully extended telescoping sections will reach approximately 130 feet. All other structural/functional features will remain the same except as otherwise configured/sized appropriately with appropriate structural integrity.

As described in other embodiments, a serpentine belt 48 extending or retracting within and with the telescoping sections 102-108 is moveable to deliver construction or other contemplated material from a rear mounted hopper through the telescoping sections to deploy where desired. Many other suitable variants, depending on various uses, are also, of course, contemplated herein.

Figure 19:
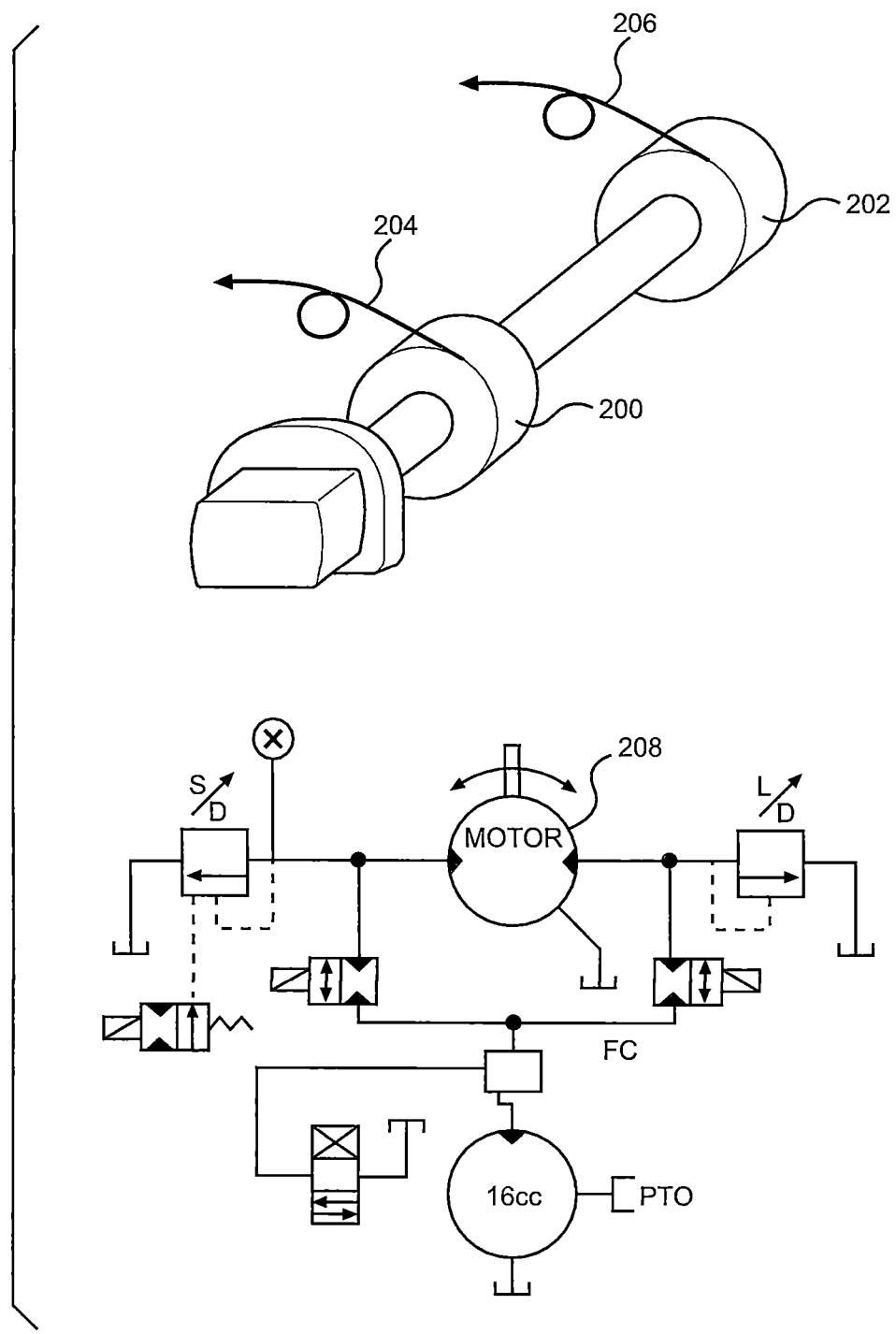
FIG. 19 illustrates a preferred embodiment of a tension control apparatus for use in embodiments of the invention.

In addition to the above-described embodiments it is contemplated that the extendable telescoping portions/sections 102-108 be provided with an automatic flexible tensioning means 200 for tensioning the serpentine belt means as desired for contemplated performance when in use, or detensioning when in storage on rollers as described. The tensioning means 200 may be a cable situated on pulleys to keep the tension preferably between 800 to about 1200 psi, but whatever range proves acceptable is contemplated for use herein. Usually, a 4:1 ratio between the pulleys is preferred. FIG. 19 illustrates one embodiment of a preferred pully equipped tensioning means for use in this inventive apparatus. Here, left and right side cable drums 200 and 202 respectively, operate respective left side 204 and right side 206 block and tackle apparatus to maintain desired tensioning, or detensioning via an operative motor 208 as desired. Notwithstanding, any suitable tensioning or detensioning apparatus may be used.

In this preferred embodiment, the hydraulic control system for concrete conveyor is run off of PTO driven hydraulic pump. Oil is pumped into system running to two 4×2 hydraulic valves electrically controlled to turn hydraulic motor in either direction. This is to achieve a constant controlled belt tension as shown in FIG. 19. This is done by allowing belt tension to remain the same tension, while running the boom telescopically in and out. This keeps the belt at a constant hydraulic pressure on the bi-directional motor. As shown in FIG. 19, the motor is connected to two pullies, which is connected to a cable tensioning the belt against a take-up pully. This achieves the proper tension for material to be able to be conveyed over the belt. The system is then opened and closed in each direction of the electrically controlled valves to allow oil to enter in one direction from the pump on one side of the motor keeping tension while other valve allows oil to return and belt is telescoped out or in. FIG. 19 illustrates an embodiment of a preferred tensioning system embodiment showing right and left side cable drums 200, 202 controlling or reeling right and left side block and tackle 204, 206 which act as cables and take up pullies tensioning the serpentine belt as desired.

Figure 13:
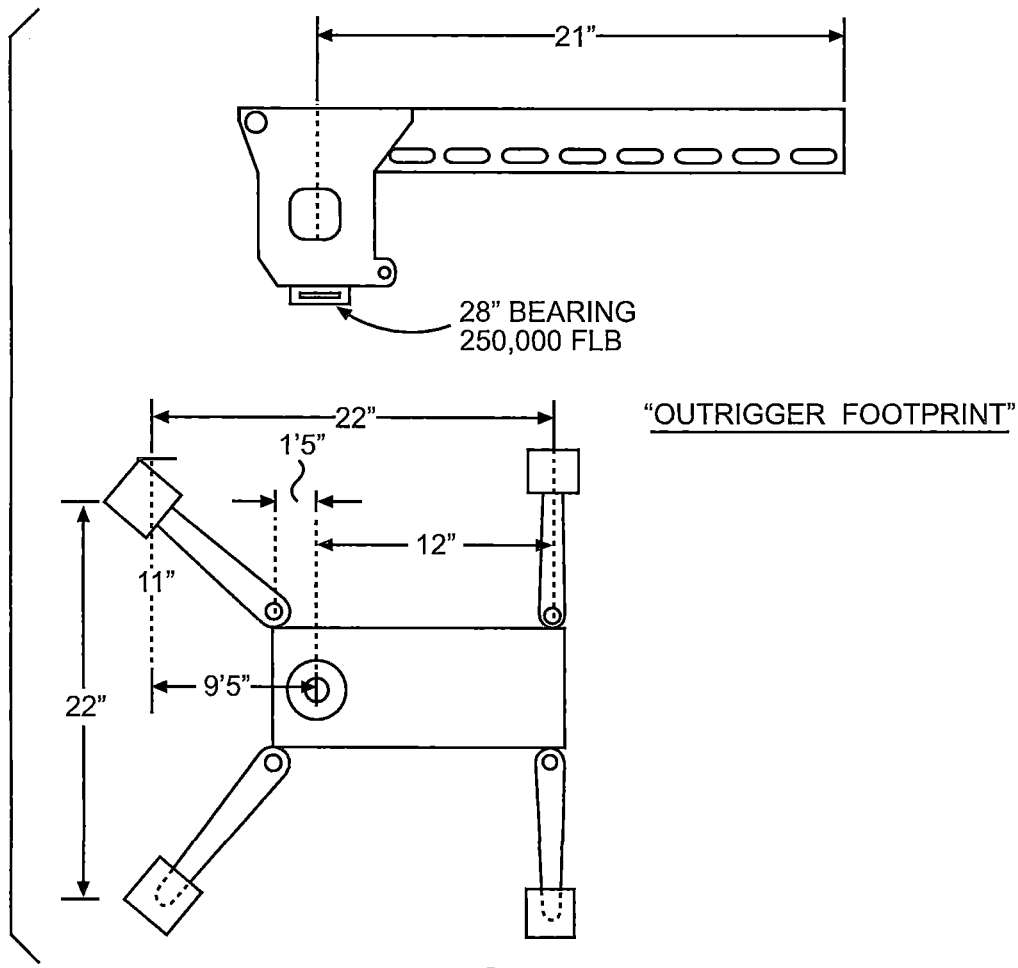
FIG. 13 illustrates a preferred embodiment of additional components of the telescoping sections and outrigger sections of the invention.

FIG. 13 illustrates some preferred measurements of an outrigger footprint as contemplated in some embodiments.

Figure 14:
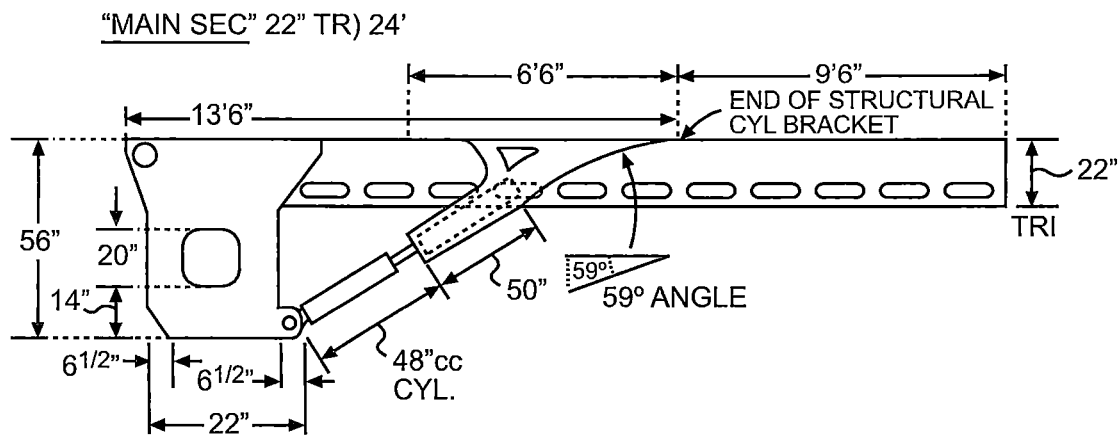
FIG. 14 illustrates yet additional preferred embodiments of components of the telescoping sections of the invention.

FIG. 14 illustrates some preferred measurements of a hydraulically moved main telescoping section as contemplated in some embodiments herein. This may be envisioned or thought of as a "payload per distance" feature on a telescoping conveying structure. This feature provides advantages for placement of materials of a contemplated capacity at varying distances as contemplated.

Figures 15, 16:
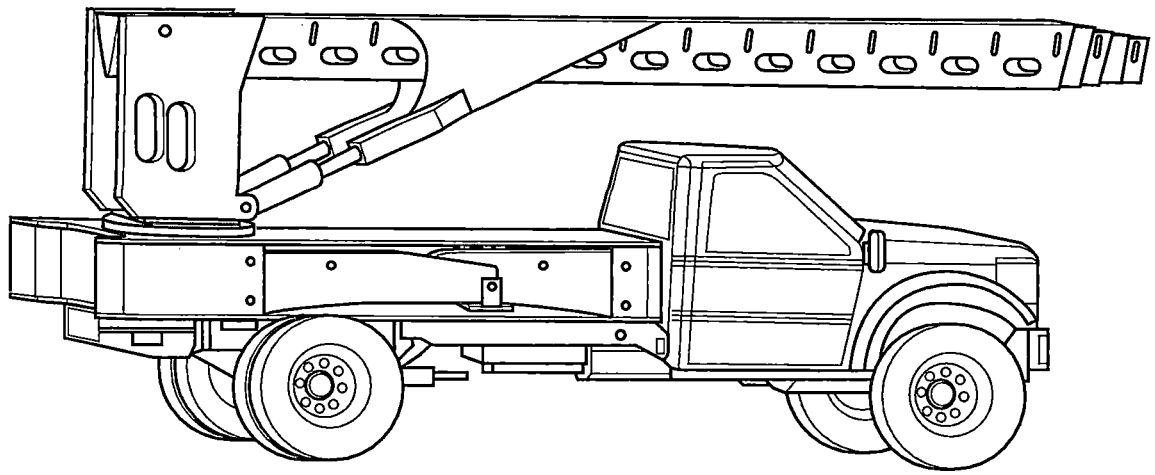
FIG. 15 illustrates still yet additional preferred embodiments of telescoping means of the invention, depicting weight characteristics of telescopic sections, conveyor belt, liner and cable, as calculated in FIG. 17.
FIG. 16 illustrates in perspective view of an additional preferred embodiment of the telescoping conveyor means as adapted to a pickup truck rolling chassis.

In yet an additional embodiment or aspect of the invention as shown in FIG. 15, preferred weight per telescoping section as contemplated may, without limitation, be calculated with the aid of the force diagram depicted in FIG. 17 and the formula shown in FIG. 17.

As shown in FIG. 15, in a five-section contemplated conveyor model, preferred section measurements with respective weights are depicted, along with belt weight, liner and cable weight all showing the extremely light weight design of the invention including individual sections and payload capacity while maintaining competitive placement capacity not heretofore possible.

FIG. 16 shows an additional perspective view of a conveyor apparatus embodiment of the invention with nested telescoping sections.

Figure 18:
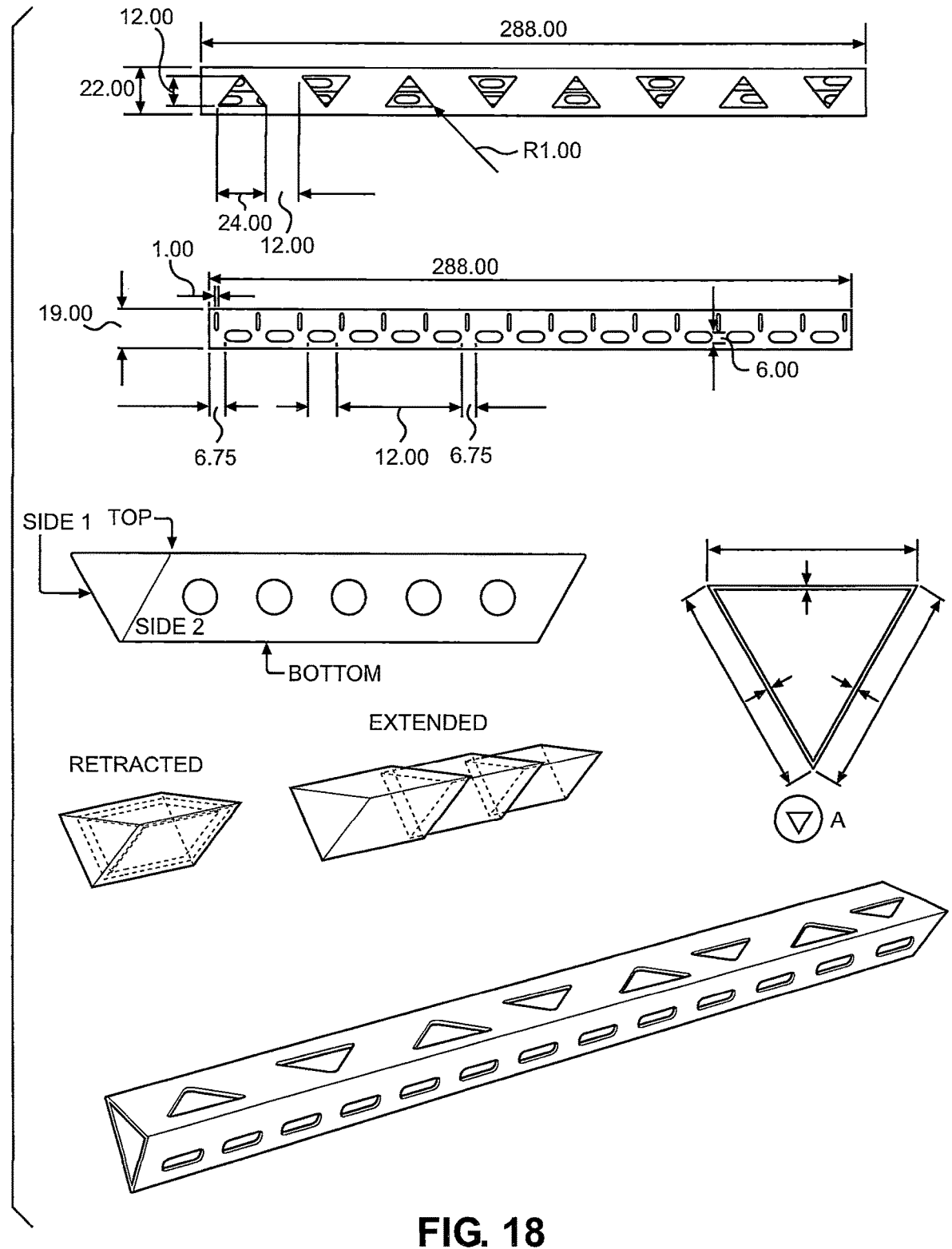
FIG. 18 illustrates yet further preferred embodiments of telescoping sections of the invention.

FIGS. 17 and 18 show some example calculations of nested telescoping sections measurement for use in various embodiments of the invention as contemplated.

Conveyor without Rolling Chassis and Self-Powered

When hydraulic tension control valve not engaged, serpentine belt has zero tension on it. The inventive design provides the only in and out conveying system that has a constant tension monitor control serpentine track design as discussed above. As shown, there are a plurality, in this preferred embodiment four dual rolling wheels at each corner of the serpentine roller track frame, that are glided back-and-forth in a serpentine belt frame system to allow in and out extension. This is only able to be done of this size and magnitude because of the belt thickness and durability to create a serpentine material conveyor belt track system beneath the main structure. This allows needed belt to be released out to extending sections under constant tension control monitoring. As system goes out tension control is let off to allow sections to be extended out while releasing that pressure it allows the serpentine track to feed belt out in extending sections. The opposite happens when the sections are pulling inward, tension is kept at set torque to keep correct tension on serpentine track to not allow belt slippage on main feeder roller and constant monitoring.

As a further aspect of the invention, the entire conveying section apparatus complete with nested telescoping sections for material placement may, by itself, without rolling truck chassis be utilized as, for example, mounted or placed on any trailerable and/or movable platform, sled and the like to be brought or maneuvered to a work site as contemplated, and either contemplated to be powered by any suitable source or provided as self-powered. Due to its compact size and weight, such inventive conveying apparatus is capable of accessing areas of desired use activity which is not possible for conventional truck or vehicle mounted on mountable material placement capacity to provide advantages not previously thought possible in the various material placement industries.

Figure 20:
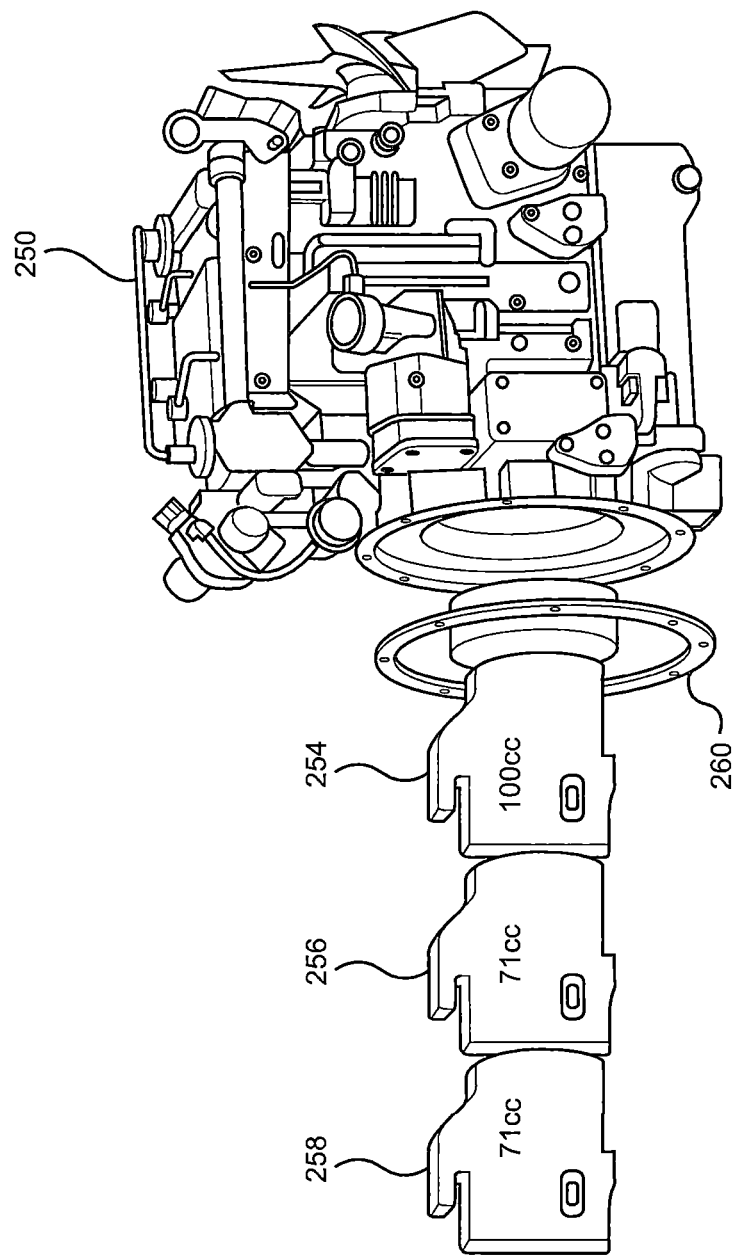
FIG. 20 illustrates yet a further embodiment of the invention employing a self-powered conveyor apparatus and system.

As another preferred embodiment of the inventive conveyor apparatus there is provided the conveyor apparatus as described above with all described components, except the rolling chassis with engine PTO power, e.g., truck chassis mounted. In this embodiment, the conveyor apparatus as generally shown above may be provided as a stand alone unit and powered by an engine or motor unit 250 shown in FIG. 20 The unit 250 may be powered with all its attendant components as shown above with a suitable engine or motor 250 in a piggy back arrangement with a series of pumps 254, 256, and 258 mounted to motor or engine 250 with mounting flange 260. The first pump in series 254 is preferably of 100 cc capacity which is in hydraulic operating communication for a main roller described above. The next two pumps 256 and 258 connected to pump 254 by respective connection flanges are preferably of 71 cc capacity, with one to power the feeder for concrete slurry or other material delivery, and with the other hydraulic pump to operate the extending sections described above and rotational capability. Pump mounting plates, or flanges such as provided by Hays Manufacturing, Inc., which produces power transmission products, may, as an example, be employed. Desired material construction and dimensions are selected as contemplated.

Engine or motor 250, may be advantageously of a small size for compactness, such as a KUBOTA® engine of D1105-T-EB series, 3-cylinder, turbocharged diesel engine, mounted on a platform and situated anywhere as desired. Other suitable examples include the Hydra-Tech® portable hydraulic power unit model HT350YS mounted on its own skid which may be brought to a work site or a trailer separate from a conveyor unit of the invention for flexibility in portability. As described, this diesel power unit is powered by an Yanman® diesel engine and is designed to drive several hydraulic pump models, including models S4VHL and S6TC, and includes a large capacity built-in fuel tank allowing for up to 24 hours run time. As will be recognized by the artisan familiar in this area this portable piggy back arrangement supplants the PTO function of a truck mounted conveyor, and thus eliminates the need for a powered rolling chassis for maximum flexibility of use and ease of construction, greatly reduced weight and increased portability along with advantageous cost considerations.

In still yet an additional aspect of the invention each telescoping section 102-108, or more as desired or contemplated, and any other components of the conveying invention, such as formed reinforcement joints or structural components as desired may be manufactured from engineering resins and thermoset resins, such as, for example, Metton liquid molding resin, or items manufactured by protrusion process utilizing fiber reinforcements as other resin matrixes to produce cross-sectional materials of extreme light weight and durability. As manufactured from such alternative commercially available materials, the design weights as shown in FIG. 15 and as calculated in FIG. 17 may be reduced appreciably, such as by one-third or more, for example, such as perhaps as much as 50%.

Although preferred embodiments of present invention have been presented herein, it will be understood by those skilled in the art that the invention is not limited to the described preferred embodiments. Rather, various changes and modification may and/or can be made within the spirit and scope of the invention.

The invention claimed is:

1. A portable and transferrably mountable self-powering conveying system for conveying material to a desired site comprising a hydraulically operated telescopable conveying unit of a plurality of individual telescopable sections nesting in each other or extending out from each other when telescoping said telescopable sections and an internal extendable and retractable serpentine conveying belt situated within said telescopable conveying unit which is foldable in belt storage means for storage on a plurality of rollers situated below said telescopable sections and further comprising tension control means to tension said conveying belt as desired and to detension said belt when stored on said rollers situated below said telescopable sections when not in use by said conveying means and wherein said system is operated by a detachable engine and one or more detachable hydraulic units detachably connected to the engine.

2. The system of claim 1, wherein the conveying belt extends and retracts on a moveable track and operates within said telescoping sections by sliding on slidable surfaces and/or rolling on wheel means to convey material to a desired site.

3. The system of claim 1 wherein said telescopable sections are elevatable, and rotatable 360°.

4. The system of claim 3 wherein said telescoping telescopable sections are triangular in shape, the conveying belt weighs approximately 190 lbs. and said telescopable sections weigh approximately 3,000 lbs. and can convey approximately 150 yards of material per hour.

5. The system of claim 1 wherein said telescopable sections reach a distance of approximately 100 feet when fully extended.

6. The system of claim 1 which additionally contains a removable hopper means to load material to be conveyed.

7. The system of claim 1 which is diesel powered.

8. The system of claim 1 wherein said portable conveying system can be operated by one person at all times and driven with a consumer operating license.

9. A portable material conveying system and apparatus comprising a conveying means of telescopable sections nesting in each other and a non-telescopable section and extending out from said non-telescopable section and each other when telescoping, and an internal extendable and retractable serpentine conveying belt situated within said means of non-telescopable and telescopable sections and further comprising a tension control means to tension said conveying belt as desired and to detension said belt below said telscopable sections on a plurality of rollers when not in use and able to convey approximately 150 yards of material per hour and which extendable and retractable telescoping sections weigh approximately 3,000 lbs.

10. The portable conveying system and apparatus of claim 9 wherein said telescopable sections are four in number nested within each other and said non-telescopable section each starting from said non-telescopable section weigh approximately, 1,000 lbs., 650 lbs., 480 lbs., 340 lbs. and 225 lbs., respectively.

* * * * *